United States Patent
Aubault et al.

(10) Patent No.: US 8,007,204 B2
(45) Date of Patent: Aug. 30, 2011

(54) FLOATING STRUCTURE FOR SUPPORT OF MIXED USE FACILITIES

(75) Inventors: Alexia Aubault, San Francisco, CA (US); Dominique Roddier, Berkeley, CA (US); Christian Cermelli, San Francisco, CA (US)

(73) Assignee: The Seasteading Institute, Mt. View, CA (US)

( * ) Notice: Subject to any disclaimer, the term of this patent is extended or adjusted under 35 U.S.C. 154(b) by 373 days.

(21) Appl. No.: 12/321,052

(22) Filed: Jan. 15, 2009

(65) Prior Publication Data

US 2010/0086362 A1   Apr. 8, 2010

Related U.S. Application Data

(60) Provisional application No. 61/195,125, filed on Oct. 3, 2008.

(51) Int. Cl.
*E02D 23/02* (2006.01)
*E02B 17/00* (2006.01)

(52) U.S. Cl. ........................................ 405/205; 405/200

(58) Field of Classification Search .............. 405/195.1, 405/196, 198, 199, 200, 203, 205, 207, 208; 114/258
See application file for complete search history.

(56) References Cited

U.S. PATENT DOCUMENTS

| | | | | |
|---|---|---|---|---|
| 2,621,485 A * | 12/1952 | Ross | | 405/207 |
| 3,118,283 A * | 1/1964 | True et al. | | 405/200 |
| 3,605,669 A * | 9/1971 | Yu | | 114/122 |
| 4,388,024 A * | 6/1983 | Dysarz | | 405/198 |
| 4,427,319 A * | 1/1984 | Mayr | | 405/196 |
| 4,472,084 A * | 9/1984 | Boon | | 405/211 |
| 6,648,555 B2 * | 11/2003 | Mommaas et al. | | 405/224 |
| 7,037,044 B2 * | 5/2006 | Xu et al. | | 405/200 |
| 7,258,510 B2 * | 8/2007 | Kawasaki | | 405/198 |
| 7,594,780 B2 * | 9/2009 | Bull | | 405/195.1 |
| 7,594,781 B1 * | 9/2009 | Sanders | | 405/198 |
| 2005/0191136 A1 * | 9/2005 | Xu | | 405/203 |
| 2008/0025799 A1 * | 1/2008 | Kawasaki | | 405/198 |
| 2010/0221069 A1 * | 9/2010 | Brinkmann et al. | | 405/203 |

* cited by examiner

*Primary Examiner* — Tara Mayo-Pinnock
(74) *Attorney, Agent, or Firm* — Robert K. Tendler, Esq.

(57) ABSTRACT

A method for providing a sustainable offshore community that includes a floatable, low cost platform structure which covers a large amount of real estate and is supported above the surface of the ocean from columns which pass through the structure such that the extremities of the structure are supported with stays that run from the top of the columns to the extremities of the platform. This type of staying structure permits the formation of the large floatable platform for supporting self sustaining communities by providing sizeable living and recreational areas, thus to permit an offshore community to exist at sea for a number of years.

2 Claims, 24 Drawing Sheets

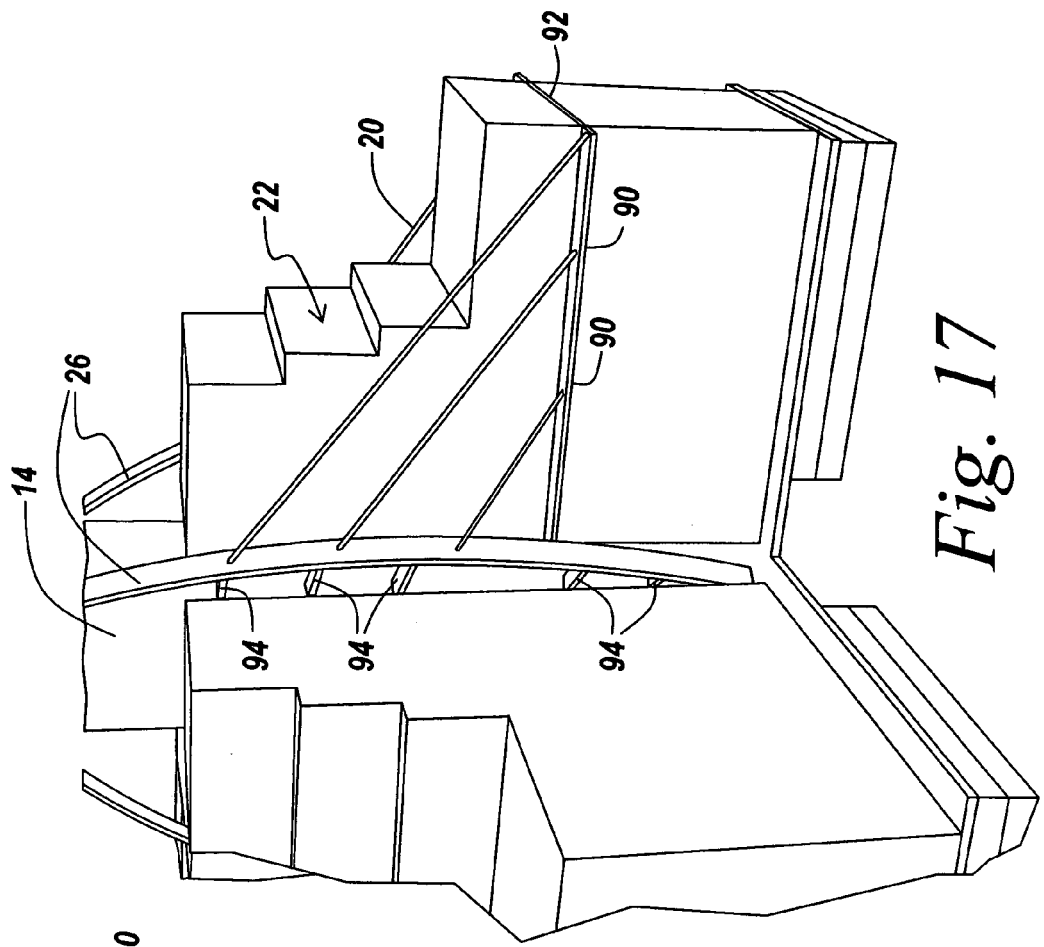
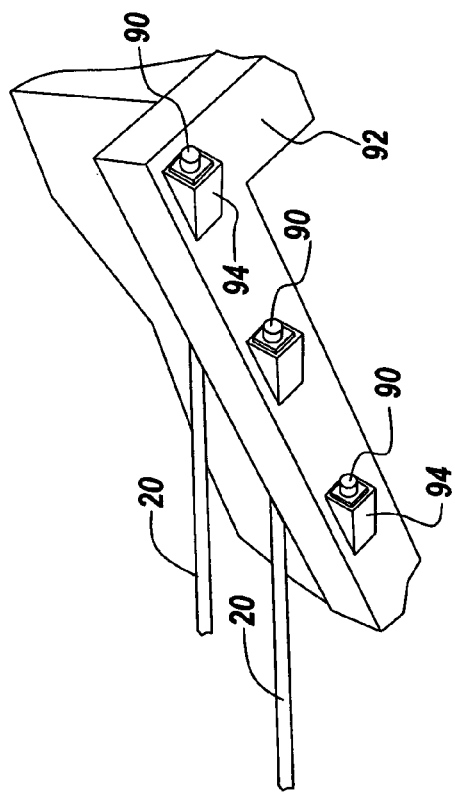
Fig. 17
Fig. 18

Top view of ¼ Seastead (1 column)

Cables on Secondary Surfaces

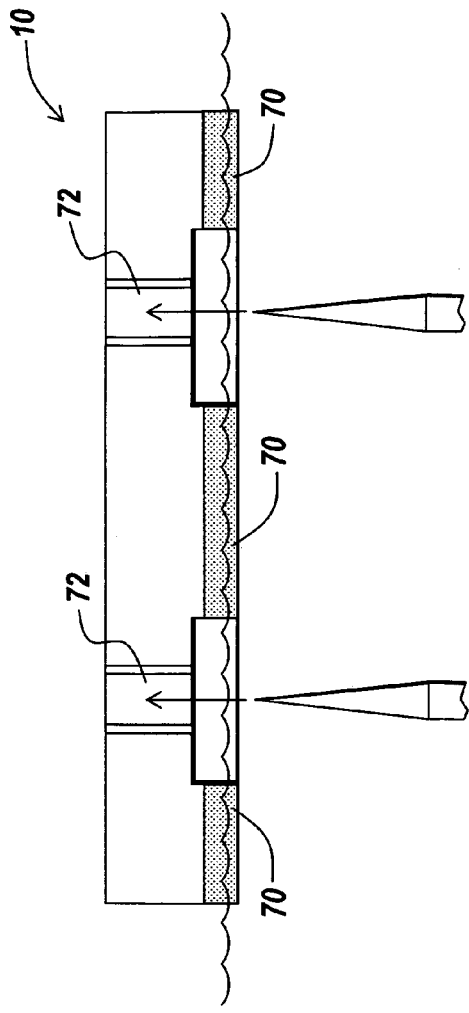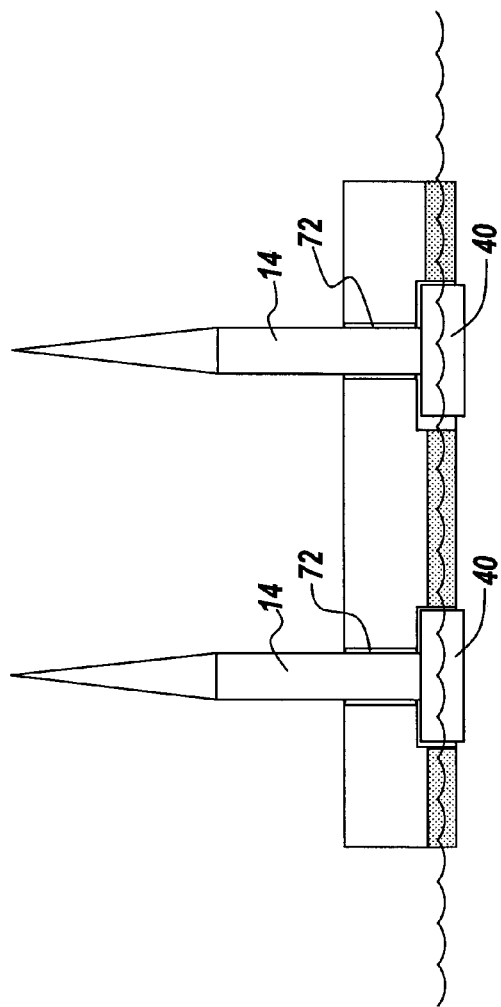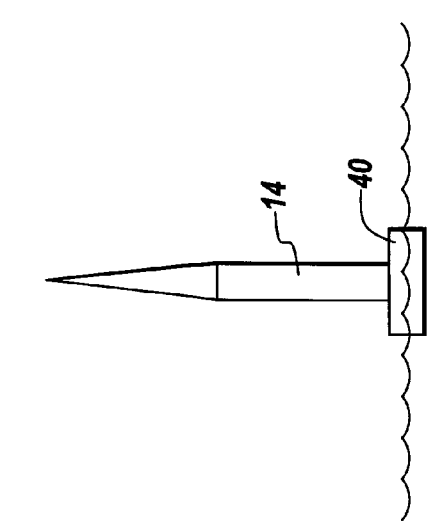

FLOATING STRUCTURE FOR SUPPORT OF MIXED USE FACILITIES

RELATED APPLICATIONS

This Application claims rights under 35 USC §119(e) from U.S. Application Ser. No. 61/195,125 filed Oct. 3, 2008, the contents of which are incorporated herein by reference.

FIELD OF INVENTION

This invention relates to an infrastructure that permits the building of communities in the middle of the ocean, and more particularly to a floating facility designed to maximize living areas while at the same time housing hundreds of individuals participating in the community.

BACKGROUND OF THE INVENTION

There has been a suggestion that colonies or communities should be provided outside the reach of territorial governmental jurisdictions so that the community can develop its own rules and governance free of the strictures of traditional governmental regulations.

It has been a goal of such communities to try out new forms of government to be able to govern the populace and also to present business opportunities such as for aquaculture, pharmaceutical production and the warehousing of software and the like.

One of the tenants of the communities is to provide communities in the middle of the ocean outside of the 12 mile or other limit claimed by nations. To do so there is a requirement for technology that allows offshore communities to exist offshore for extended periods of time in comfort and safety. From the political side where people want to investigate new forms of government, the first order of business is to provide a facility that numbers of people can inhabit which is commercially self supporting, for instance through power generation and aquaculture that takes advantage of the fact that there is a low level of government regulation. In the past, such governmental regulation and government intervention has prevented for instance obese people from obtaining regulation-free treatment. Moreover, less regulated medical services available in less developed counties need to be provided close to the mainland. The structure envisioned would house medical facilities where the cost structure of the land-based medical establishment does not apply. Thus, if a low cost relatively large facility could be established offshore then medical costs could be minimized. This is because regulation-drives overhead of the medical and insurance industries would be eliminated. Providing such an offshore community would make possible local availability of qualified but lower cost doctors and personnel to within, for instance 12 miles of the coast line, as opposed to having to fly patients to such far flung countries as India and Brazil where inexpensive but qualified medical help is available.

Moreover, because of national copyright, patent and trademark laws within a nation, one goal is to establish libraries and manufacturing plants that are free of intrusion from the intellectual property laws of a land-based society.

Moreover, where drugs and their delivery are heavily regulated onshore, an offshore facility could permit experimental drug use, both for saving lives and to provide recreation.

As to aquaculture, another reason to create an offshore aquaculture facility is to provide good healthy fish with for instance low concentrations of mercury. This reduction in the concentration of mercury is associated with open ocean aquaculture. Note that aquaculture associated with shore-based facilities or pens results in unhealthy fish due to the fish excrement buildup, whereas in an open ocean facility the excrement can be made to fall through the bottom of a fish cage to the bottom of the ocean, thus resulting in healthier fish. Moreover, the cages can be mounted to a floating facility moved at a slow rate to cause the fish to swim against the slight current which improves the fish muscle tone and health.

It is therefore the design criteria to be able to house approximately 200 people on a facility that is approximately 160,000 square feet in extent and to be able to provide a structure that supports not only spacious housing, but also recreation areas where the people involved do not feel like they are living in a box or a prison.

It is part of the subject invention to provide a platform which will sustain restaurants, dance clubs, swimming pools, tennis courts, or in short to provide a resort location which is both inviting and unique as a vacation destination, as distinguished from the cramped and crowded conditions aboard a cruise liner.

It is noted that the business model for the cruise ship industry requires cramming as many people into a cruise ship as possible, usually with double occupancy cabins which are quite small. This is not conducive to long-time living. It is desirable therefore to provide a platform which has a large amount of square footage per person and a large common area adjacent the portions on the platform adapted to housing. For instance, it would be desirable to be able to have a single family dwelling which is for instance 1,000 square feet. When using multiple levels this can be accomplished with a small footprint. It would therefore be desirable to have flat areas that are common areas abutted by multiple story dwellings.

Moreover, provision must be made for power generation and water purification so as to provide for the basic needs of the water-born community.

In short, there is a requirement for an offshore structure to sustain a livable community in which the total cost per square foot is minimized while at the same time providing a structure able to survive in the marine environment.

SUMMARY OF THE INVENTION

In order to provide for a suitable floating facility designed to maximize living area to facilitate a sustainable offshore community, the subject design involves four buoyant columns to support a series of decks using stays from the columns to the decks. The subject design supports the decks above the sea surface and accommodates payloads between 5,000 and 10,000 tons to house several hundreds of inhabitants. The displacement of the platform varies between 12,000 and 25,000 tons, with the total floor surface area being approximately 250,000 square feet due to multi-floor buildings on top of a 160,000 square foot deck that provides both a platform for buildings and a deck for the required open space.

In one embodiment, the peripheral cantilevered platforms expand the usable space and are supported by stays from the columns.

In order to provide such an offshore community facility, in one embodiment four cylindrical columns, each with a large footing are provided that are designed to support the main platform and project through it. These columns are designed to sustain the hydrostatic and hydrodynamic loads involved and they are water ballasted to provide stability and motion control for the platform.

In one embodiment, trusses are provided between the columns above sea level and are designed to support the compression and tension stresses due to environmental loading. They also are designed to support the dead weight of building structures located between the columns.

Note that in addition to a central platform, the above peripheral decks are cantilevered from the columns and are designed to expand the livable area provided by the platform.

To reduce the weight of the cantilevered trusses necessary to support the peripheral decks, it is part of the subject invention that stay cables are used. In one embodiment, the stay cables run from the top of the columns to various extremities of the platforms, decks and buildings, with the cables transferring the weight of the deck and buildings to the columns. In one embodiment, each of the stays is counterbalanced with a stay in an opposite direction. Alternatively, some form of symmetrical staying is utilized to balance the loading at the top of each column.

In addition, in one embodiment horizontal stays run between the tops of the column, and horizontal underwater stays or trusses run between the expanded bases of the columns utilized to provide buoyancy for the platform and heave motion control. Alternatively, a small truss may be installed between the bottoms of adjacent columns to provide additional support to the main truss at deck level.

Note, it is part of this subject invention that the buoyant columns permit elevating the entire platform structure above the surface of the ocean, with the buoyancy controlled by flooding and evacuation of the footing chambers.

In one embodiment, the construction of the facility includes moving the columns into place at four spaced apart open tubes in the main platform, providing the aforementioned staying and then raising the columns by pumping out water ballasting to tension the stays supporting the platforms and the extremities thereof, and then to move the entire platform and extremities upward so that the platform clears the ocean surface.

The entire structure is provided with a stay anchorage system in which the cable stay extremities are connected to the deck, with the anchorage involving the utilization of techniques developed for stay-cable bridges.

The tower side of the cables may be anchored directly to the columns, or to outwardly bowed arcuate external beams connected to the columns at a top and intermediate level. Note that the arcuate external beams may be welded or bolted to the columns. Note also that a damping system may be provided to counter the dynamic effects of wind and wave loads.

As to corrosion protection, all cables used require corrosion control in which passive corrosion control includes steel stay cables, the strands of which are individually galvanized and enclosed in a polymer sheath for corrosion protection. Alternative corrosion materials such as Carbon Fiber Reinforced Polymers (CFRP) can be used instead of traditional steel strand cables. Since some of the cables may be partially submerged, non-corrosive materials are used for the submerged parts. Also, redundancy in the cable design prevents major damage in case of corrosion, with the anchorage systems allowing single strand inspection and replacement at sea.

In terms of column integrity, the subject columns are designed to withstand the following loads: hydrodynamic and hydrostatic loads on the submerged part of the column; compression loads transferred by the cable tension and bending loads; and, loads at the connection of the column with the platform truss or deck. To serve this purpose, the columns are stiffened by providing ring stiffeners and stringers to prevent local buckling.

At the deck level, the column joints with the truss and the upper deck tower are designed such that loading from the cables and the truss are transferred to the lower columns through lower beams that are located about the circumference of the column.

Global buckling is of particular importance due to the compression of the column. Thus additional vertical beams may be run from the top of the tower to the bottom of the column.

Moreover, in one embodiment each column is compartmented, with the compartments having stiffened bulkheads and water-tight flats.

Additionally, due to the marine environment, sacrificial anodes cover the submerged part of the external hull of the columns for corrosion control. Moreover, for protection from the sea, columns are covered with corrosion protective plating around the waterline.

Moreover, is important to be able to provide for efficient and inexpensive construction and installation of the platform. In one embodiment, the launching and commissioning of the platform is carried out in calm weather in a shielded basin, with the parts constructed in an adjacent shipyard. In one embodiment, the main parts of the structure are built in the shipyard and are assembled as modules. In a preferred embodiment, the main deck structures consist of four modules, with the columns assembled independently.

In one embodiment, each module has an integrated water tight buoyancy chamber so that each module is designed to be stable in calm weather.

Once the modules are manufactured, they are launched and towed to an assembly site in which the deck modules are launched from the shipyard quay and float on their buoyancy modules. The buoyancy module may have a draft of 4 to 6 feet depending on the payload. Moreover, the buoyancy module can be 10 feet high and can have a freeboard of at least 3 feet.

Once assembled and in the shallow water adjacent the launching site, a tug tows the four deck modules to an assembling site where the columns are mounted to them. The assembling site is close to the shipyard. In one embodiment the assembly site is a shielded site to limit wave and wind disturbance, with the water depth being on the order of 110 feet to allow ballasting of the columns.

Similarly, the columns are launched into the water from quayside, utilizing cranes for instance.

Each column is designed to be stable on its footing, a hollow 60 foot diameter chamber in one embodiment. This footing is provided with a 15 foot draft and a 5 foot air gap, with the center of gravity of the column being twenty feet above its base. In addition to towing the modules to an assembly point, the columns are also towed out to the assembly point.

In terms of the assembly of columns and decks, the columns are pulled into the large deck modules which have an open shaft or tube to receive the columns as they are mated with the module. The columns are slightly ballasted to allow sufficient clearing of the top of the footing and the bottom of the buildings on the deck. The buoyancy modules under the main deck are designed to allow the full diameters of the footings of the columns to fit between them. Once properly oriented the columns are restrained with guides that in one embodiment include two small rails run vertically along the columns. At the deck level a hook is fitted on a rail to restrain the column horizontally and in the pitch direction. The rails act as guides to guide the column down during ballasting and up during de-ballasting.

Once the columns have been placed between the deck modules, the four deck modules are assembled using winches and guide ropes to bring the modules together. Fenders and buoys are used to avoid collisions. Once the modules are in place they are welded or bolted together.

Next in the assembly procedure the columns are ballasted by pumping water into their feet until the deck level on the column coincides with the deck modules. Thereafter the columns are ballasted to move downwardly and the stays are applied to support the deck and the cantilevered structures at the extremities of the platform. It is noted that without the cables, the deck would not be able to support its own weight once the deck is lifted above water level.

The cables are anchored to the deck with special stay cable anchorage systems and the stays are partially tensioned with the columns in the down position. Note that pre-tension is applied using stressing hydraulic jacks.

After the stays are in place, the columns are de-ballasted which pushes the columns upward. This serves to further tension the cables from the top of the columns to the extremities of the platform. Thereafter, upon further de-ballasting the platform and associated structures are elevated above the surface of the ocean.

In a further embodiment, the main deck may be provided with outlying horizontal platforms which are lightweight surfaces that may be assembled by placing the lightweight surface within the areas subtended by for instance two adjacent buildings. In the preferred embodiment, these lightweight surfaces are supported with stays anchored to the columns. The lightweight platforms may be maneuvered into position by underwater barges provided with hydraulic jacks to lift a lightweight panel to its appropriate position. After securing, the barge is removed.

In summary, a method for providing a sustainable offshore community that includes a floatable, low cost platform structure which covers a large amount of real estate and is supported above the surface of the ocean from columns which pass through the structure such that the extremities of the structure are supported with stays that run from the top of the columns to the extremities of the platform. This type of staying structure permits the formation of the large floatable platform for supporting self sustaining communities by providing sizeable living and recreational areas, thus to permit an offshore community to exist at sea for a number of years.

BRIEF DESCRIPTION

These and other features of the subject invention will be better understood in connection with the Detailed Description and in conjunction with the Drawings of which:

Figure 1:
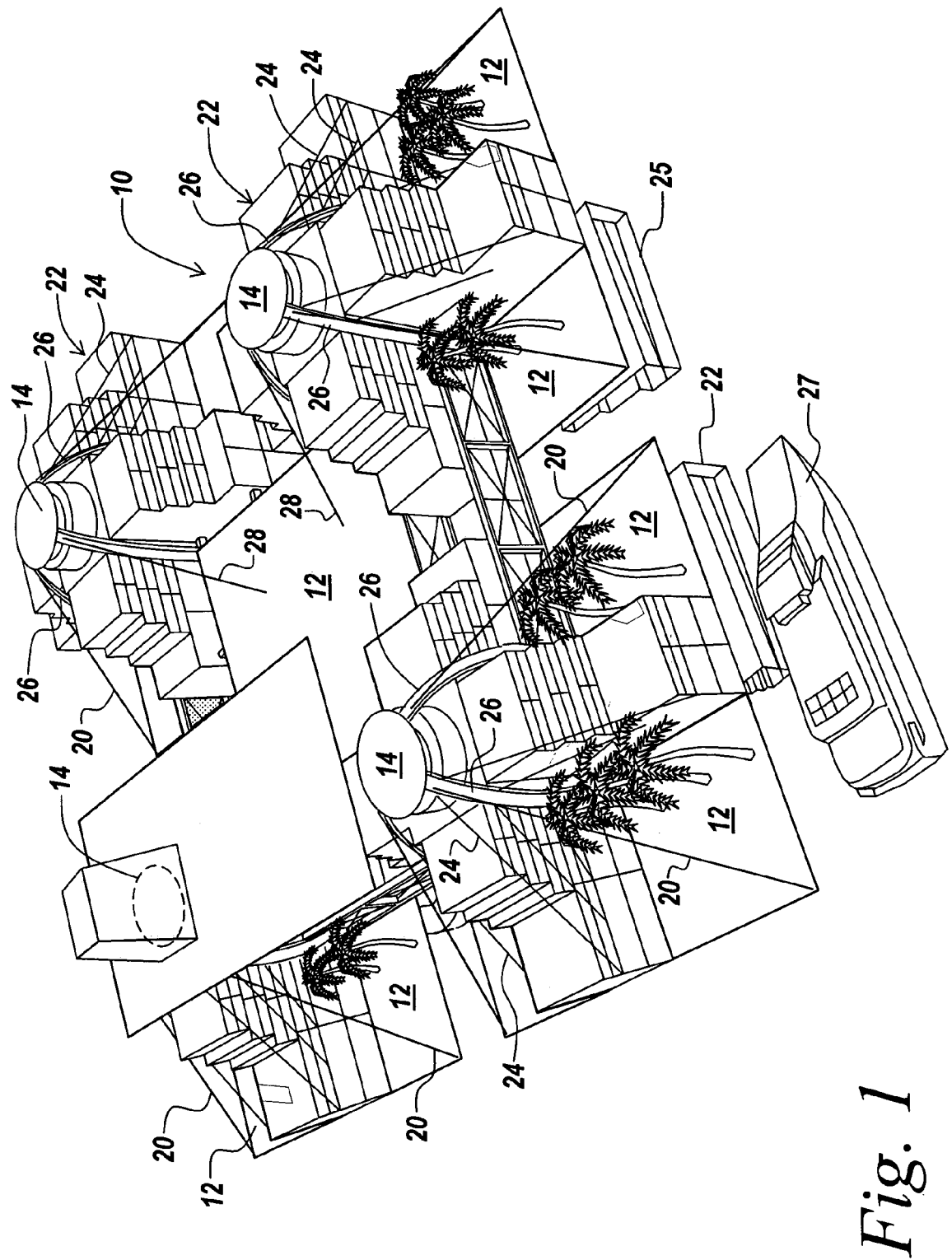
FIG. 1 is a diagrammatic illustration of a floating structure to provide maximum sustainable living space in the middle of the ocean in which various decks are cantilevered and supported with stays from columns which project up through the structure, with the columns being buoyant to tension the stays and also to lift the entire structure above the surface of the ocean.
Figure 2:
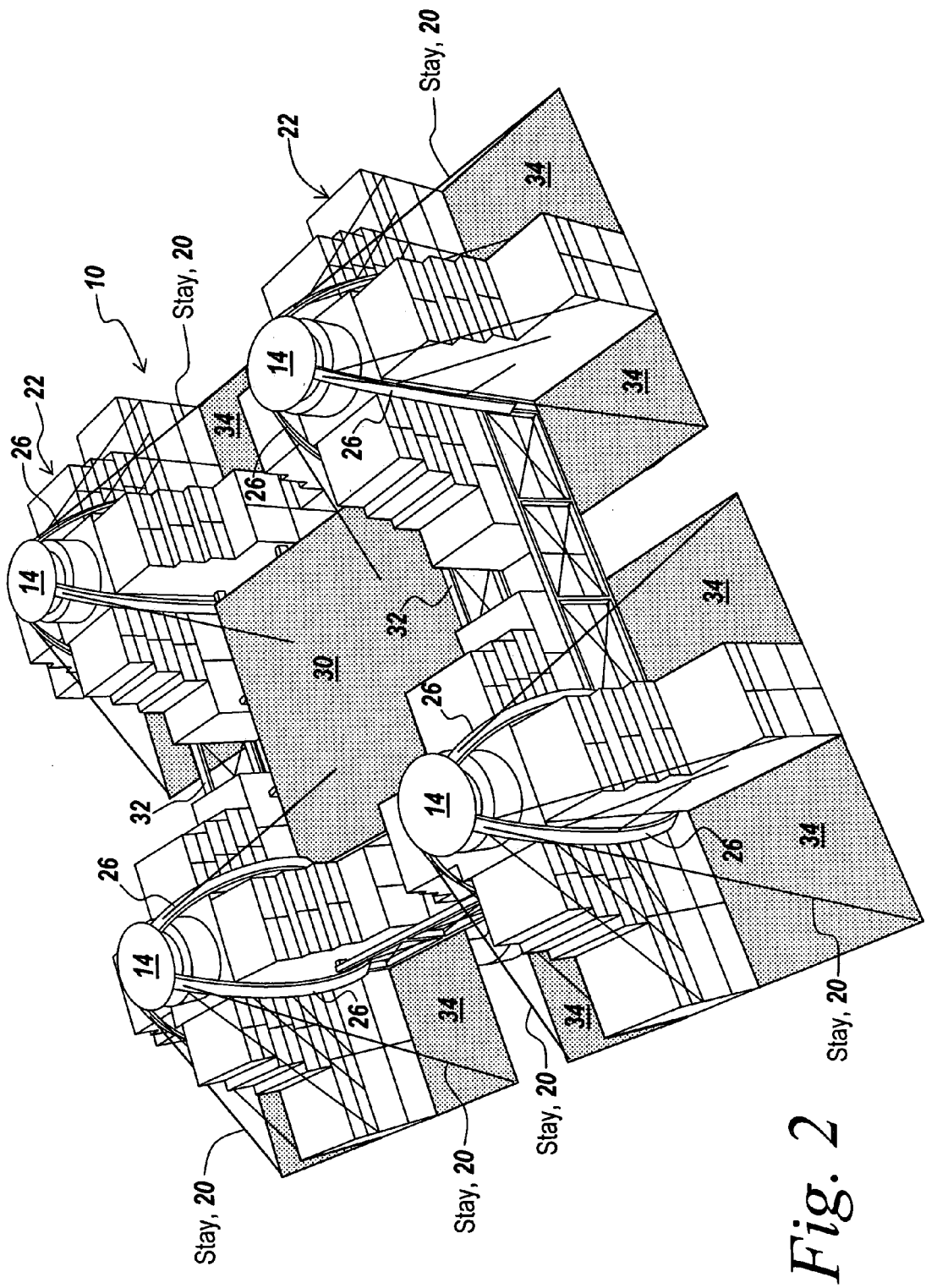
FIG. 2 is a diagrammatic illustration of the structure of FIG. 1 illustrating the use of stays to support lightweight cantilevered surfaces or decks which surround a central lightweight deck or surface between the columns of FIG. 1.
Figure 3:
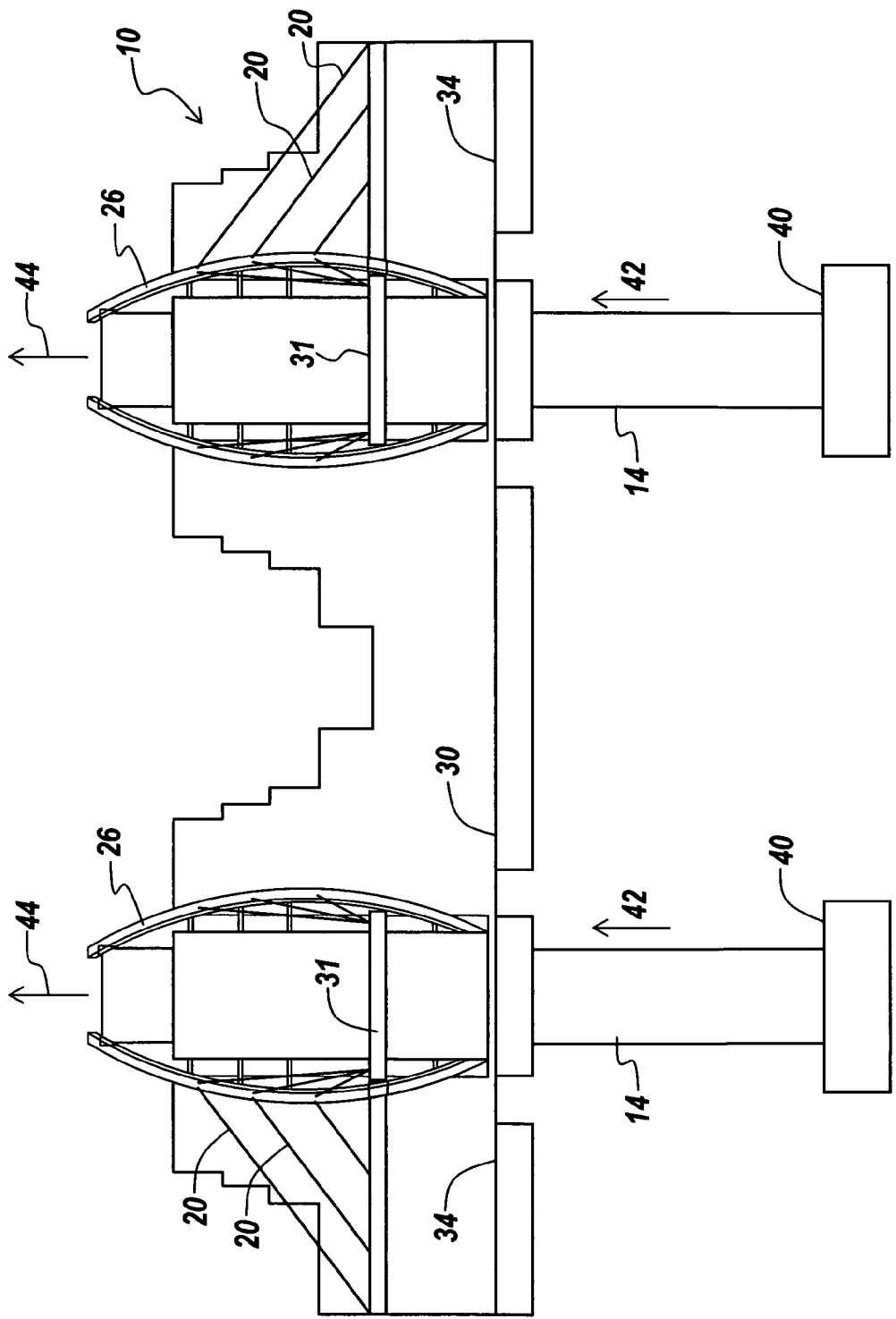
FIG. 3 is a diagrammatic illustration of the utilization of arcuate beams attached to the columns from which stays are run to support cantilevered structures.
Figure 7:
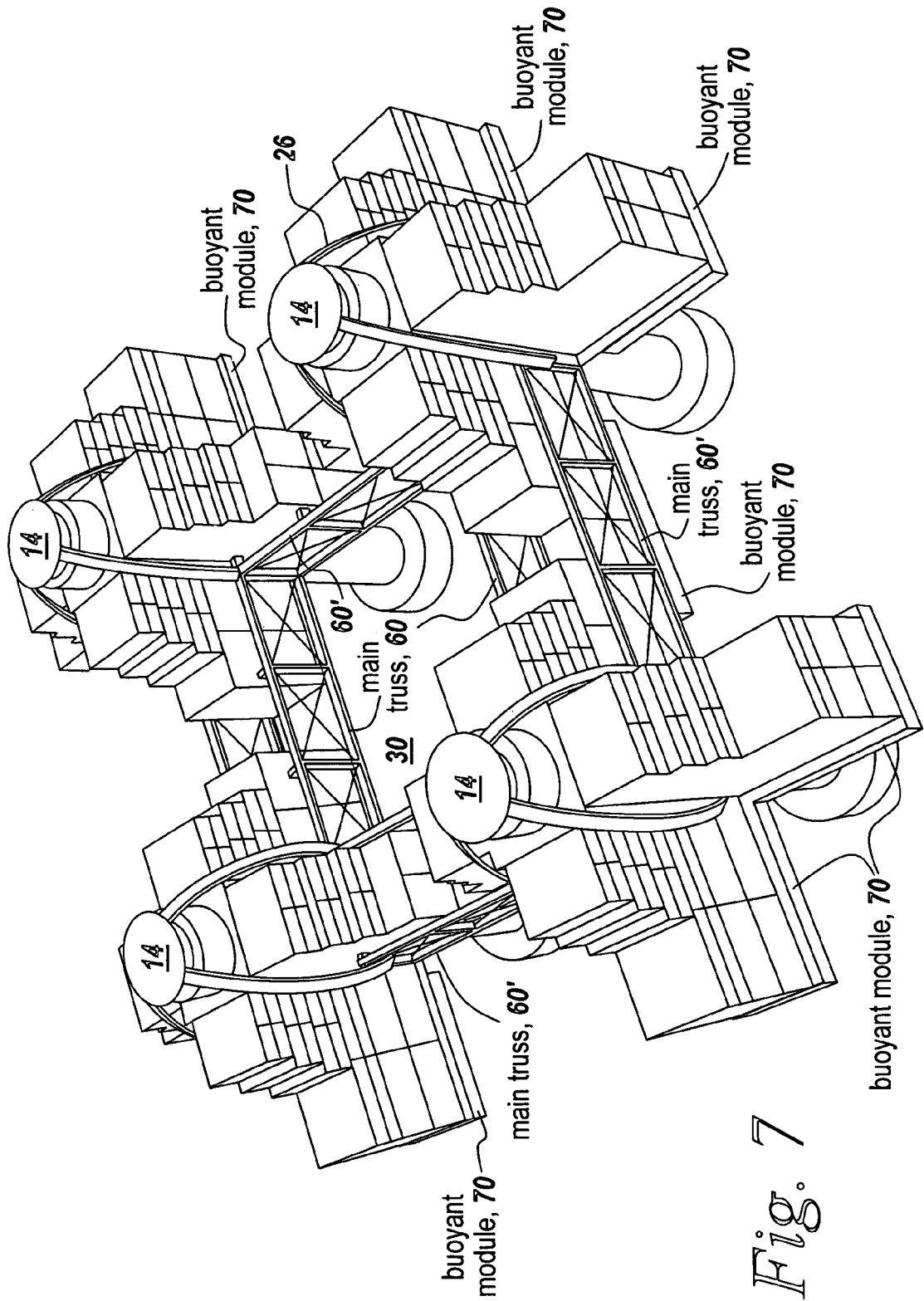
Figure 8:
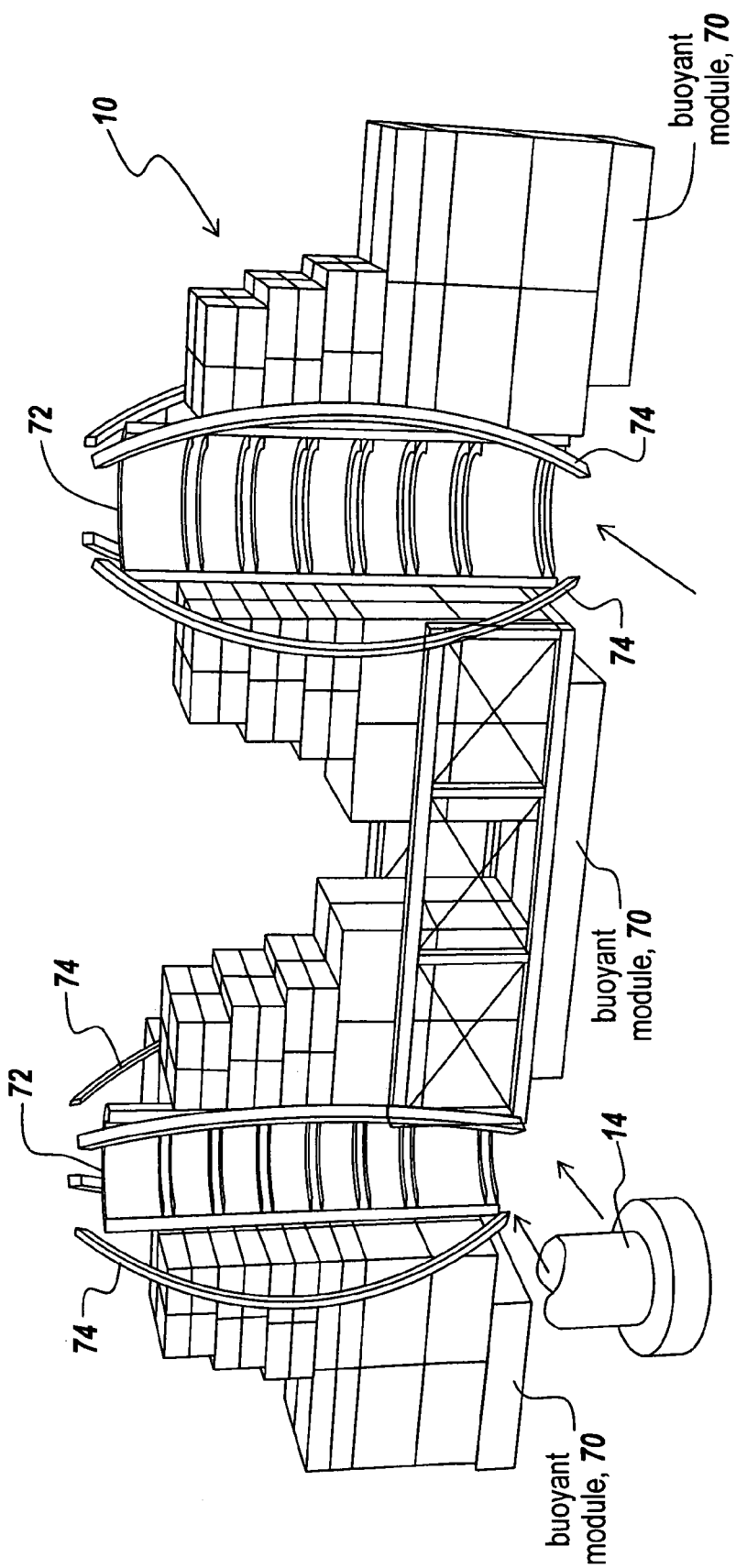
Figure 9:
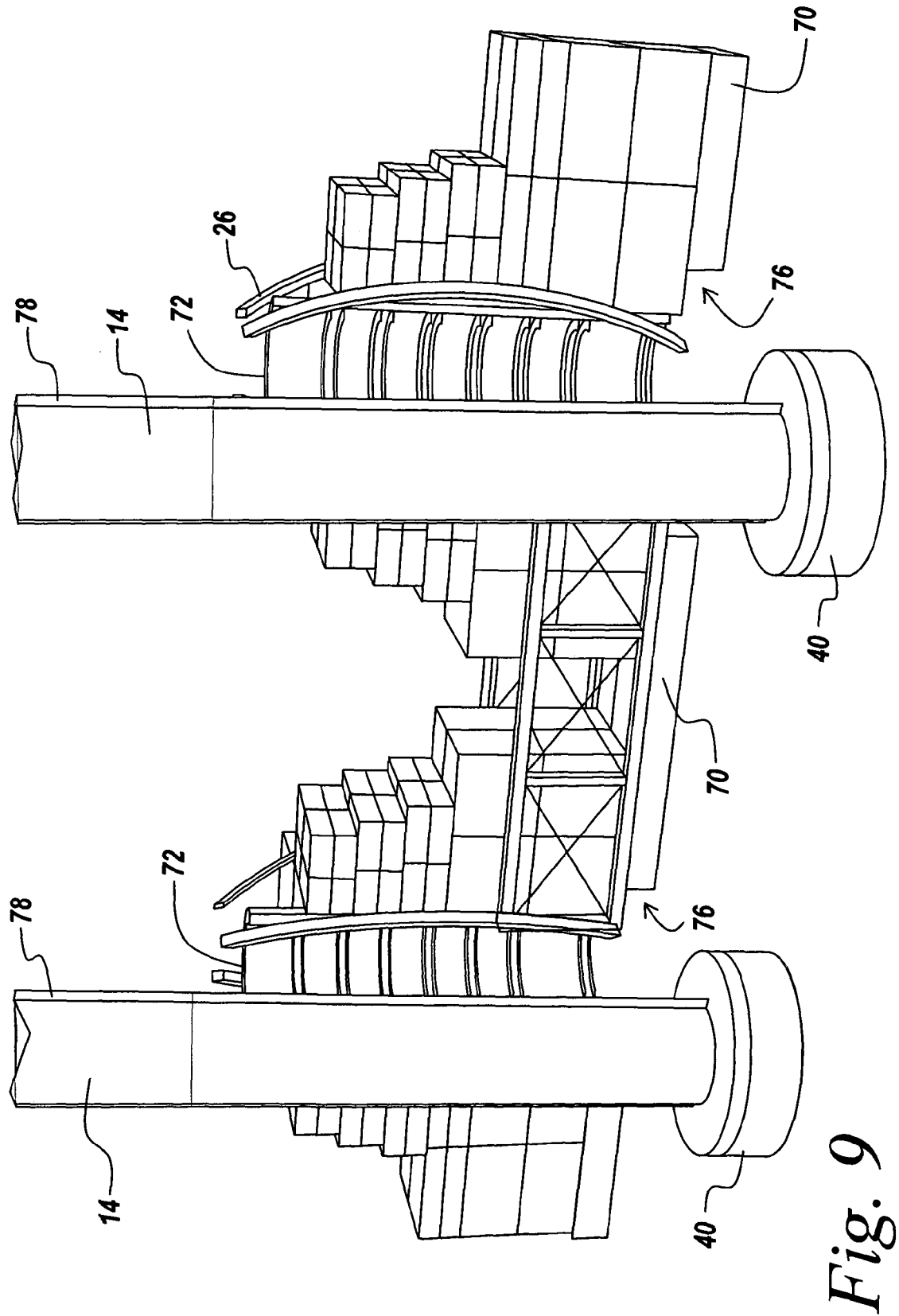
Figure 10:
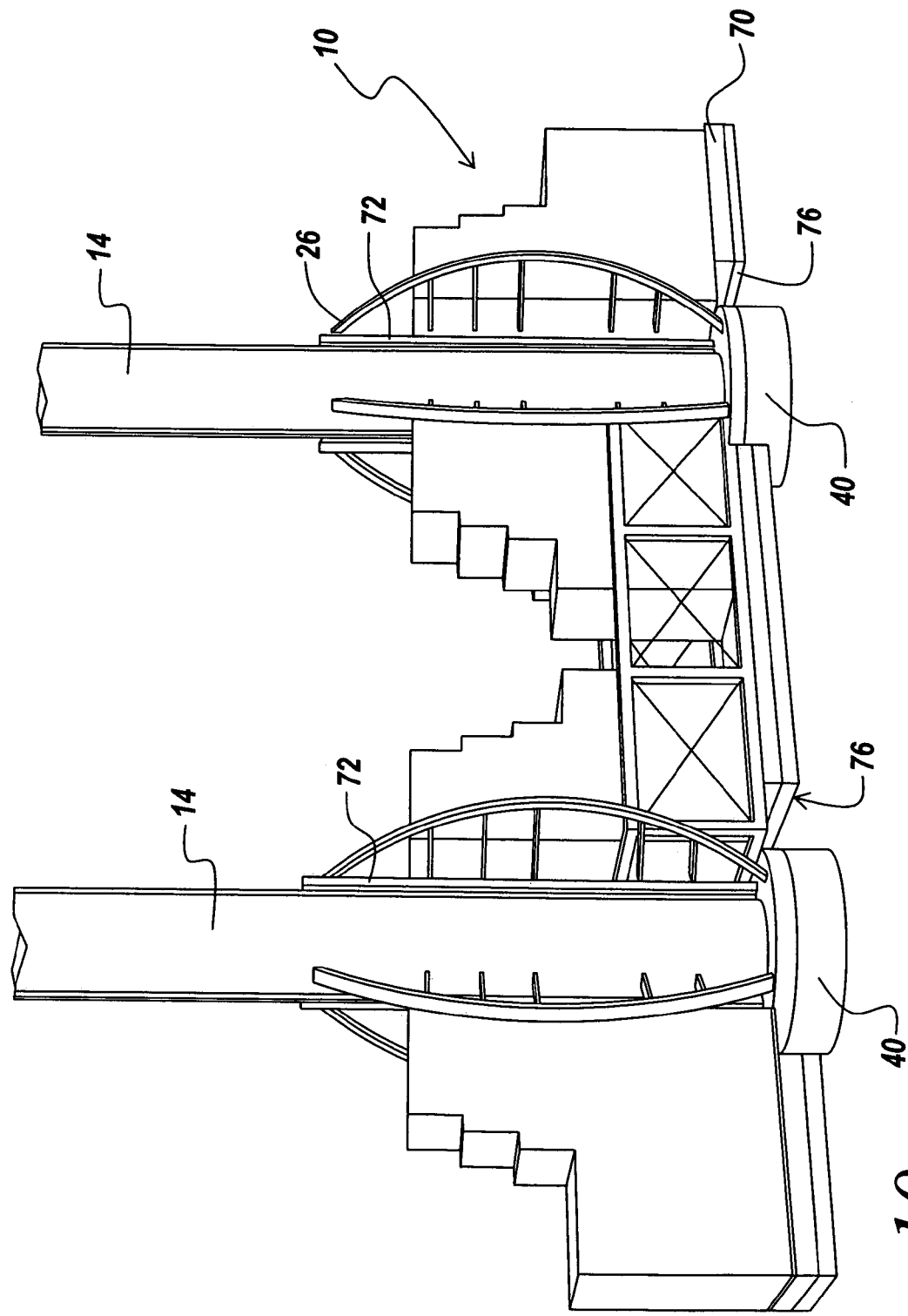
Figure 11:
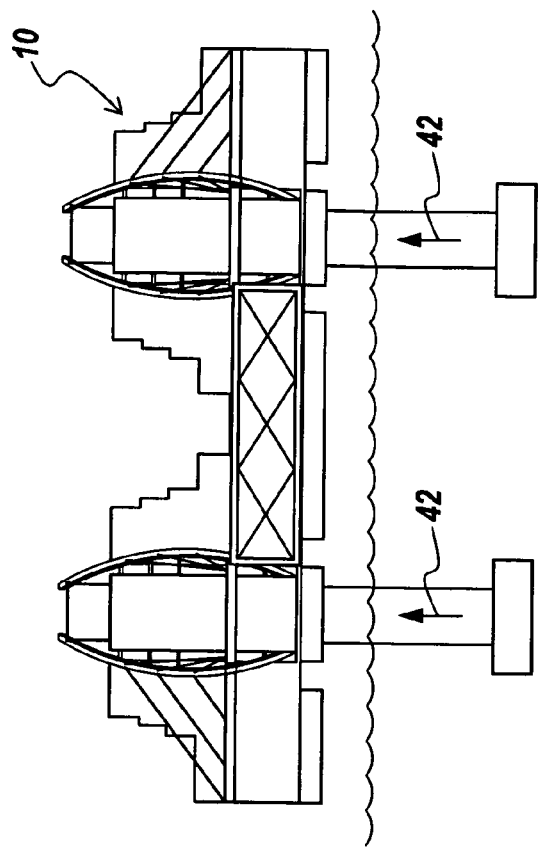
Figure 12:
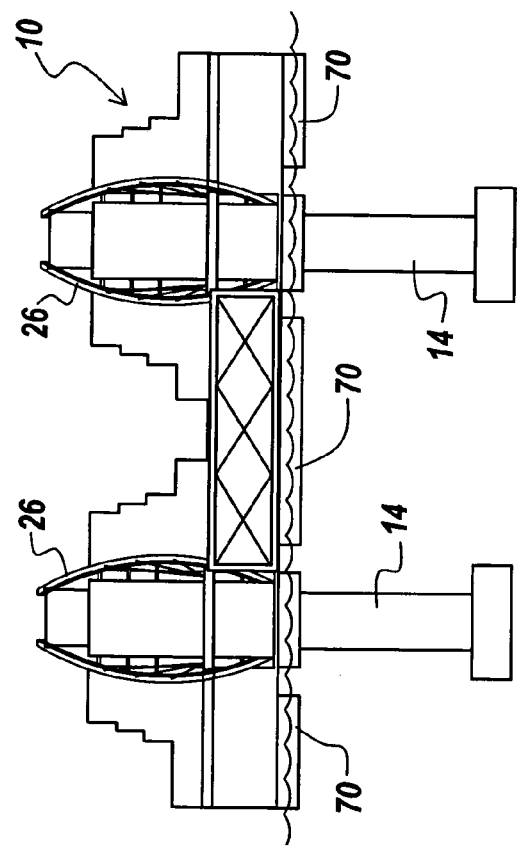
Figure 14:
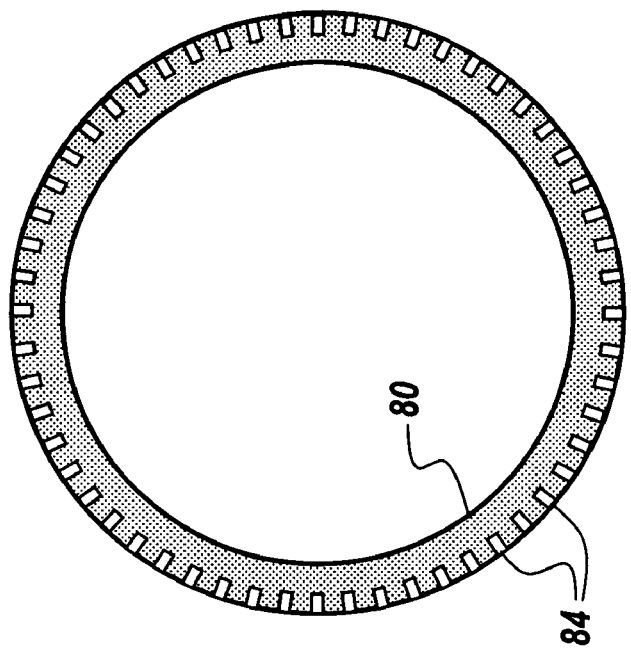
Figure 13:
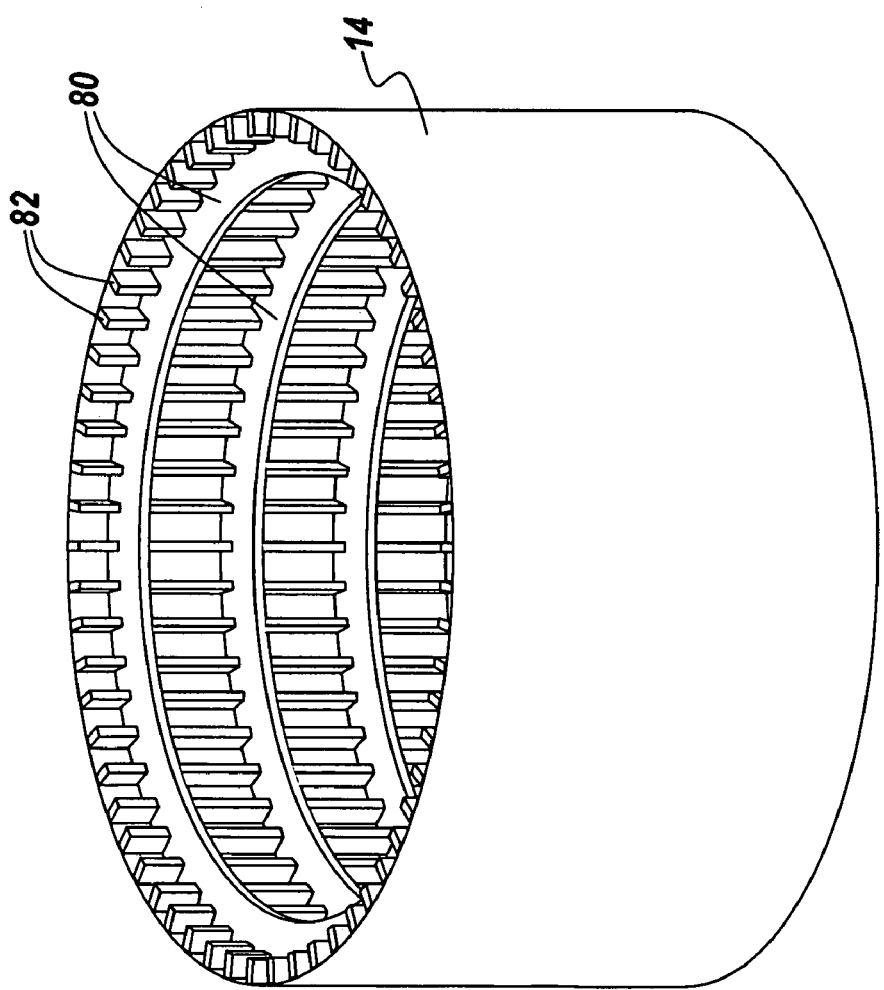
Figure 16:
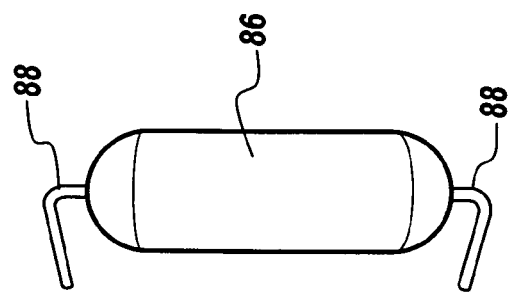
Figure 15:
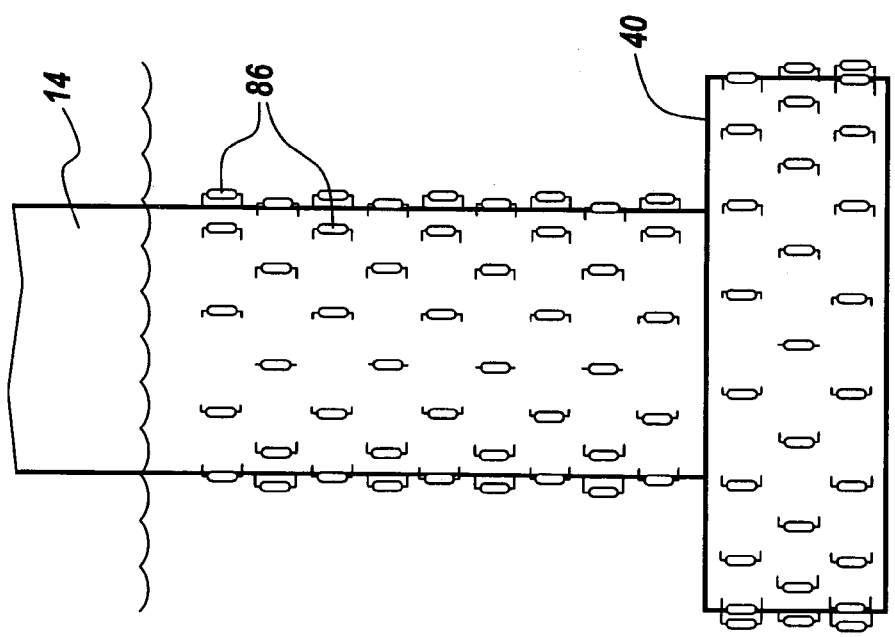
Figure 20:
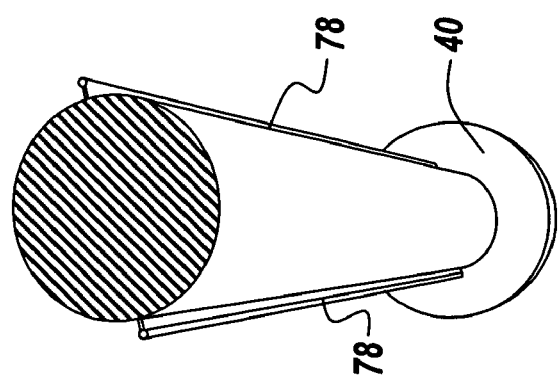
Figure 21:
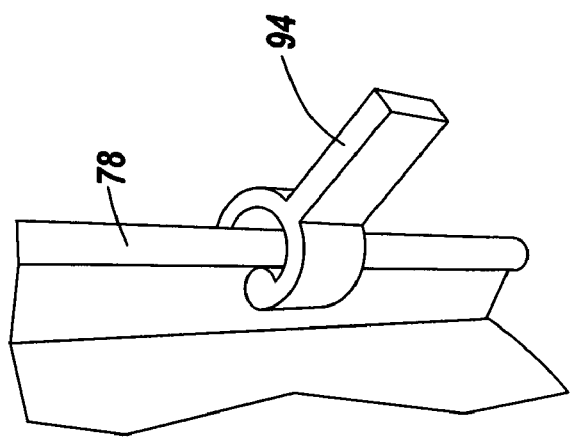
Figure 19:
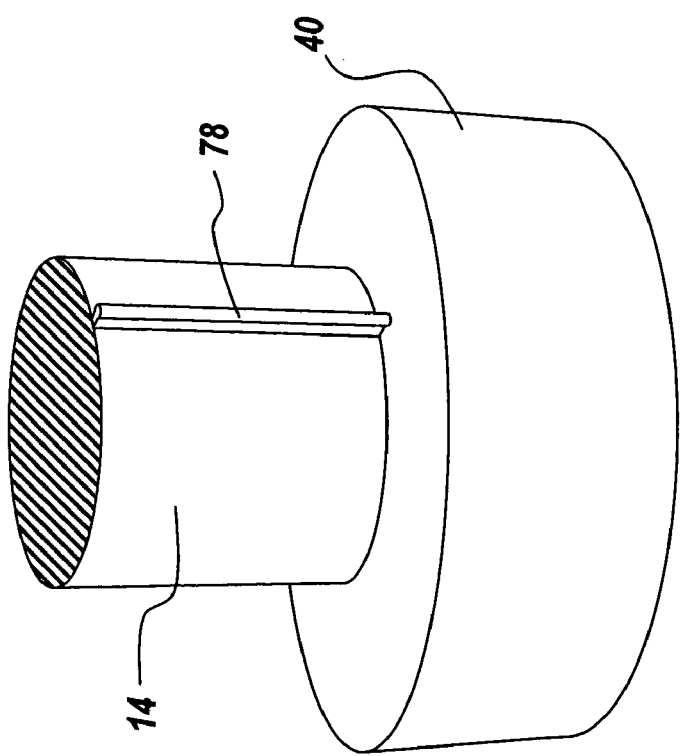
Figure 22:
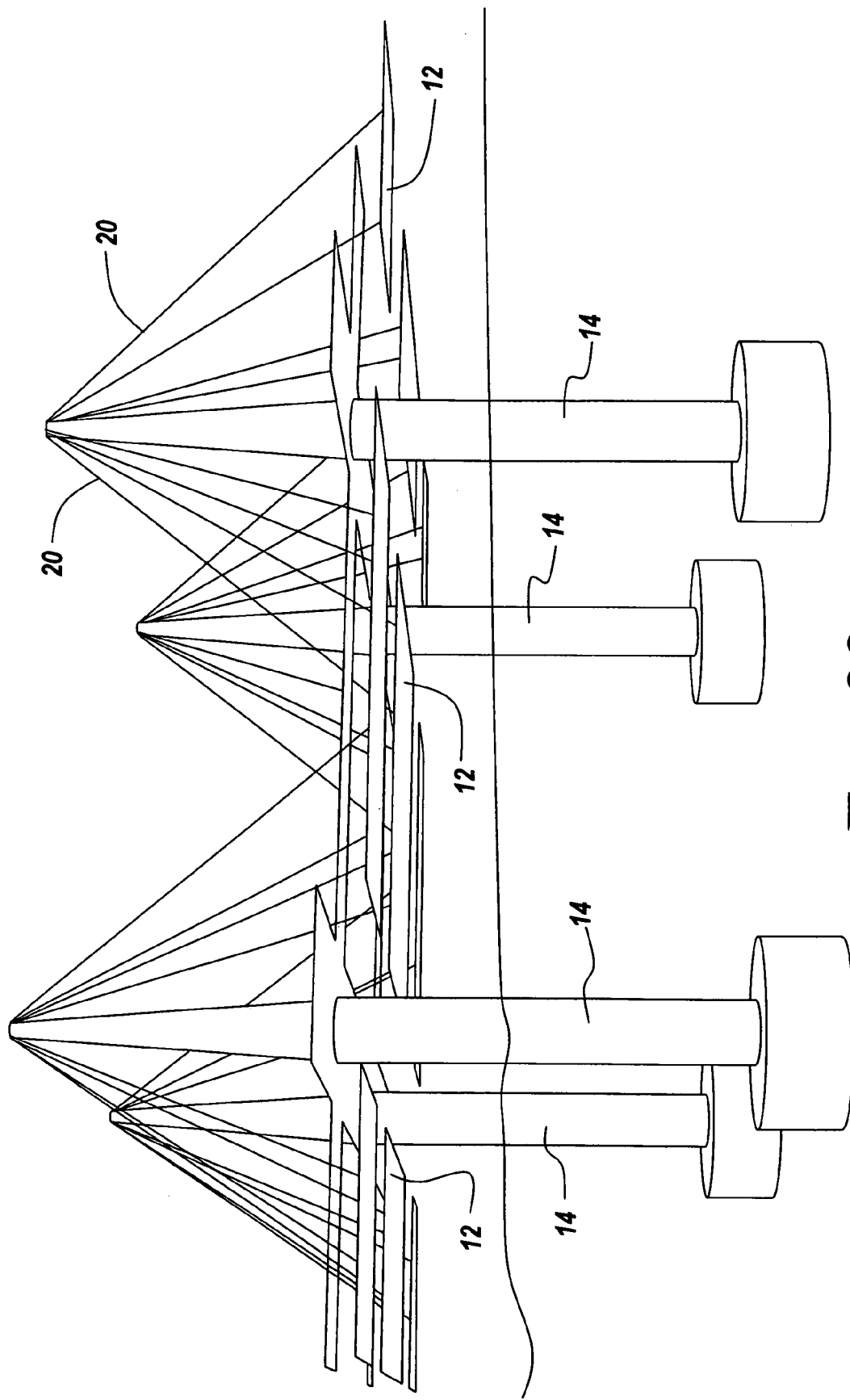
Figure 23:
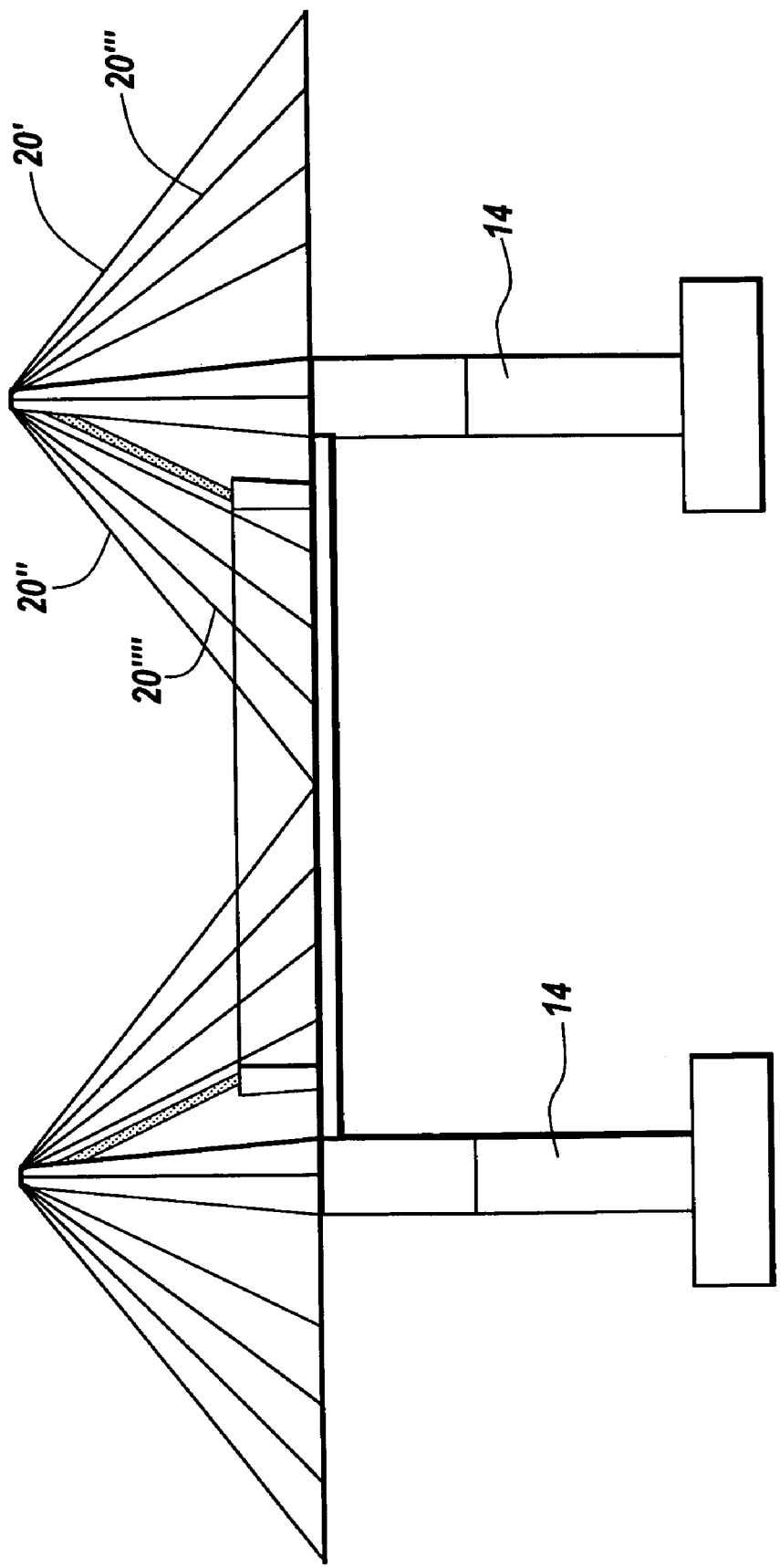
Figure 24:
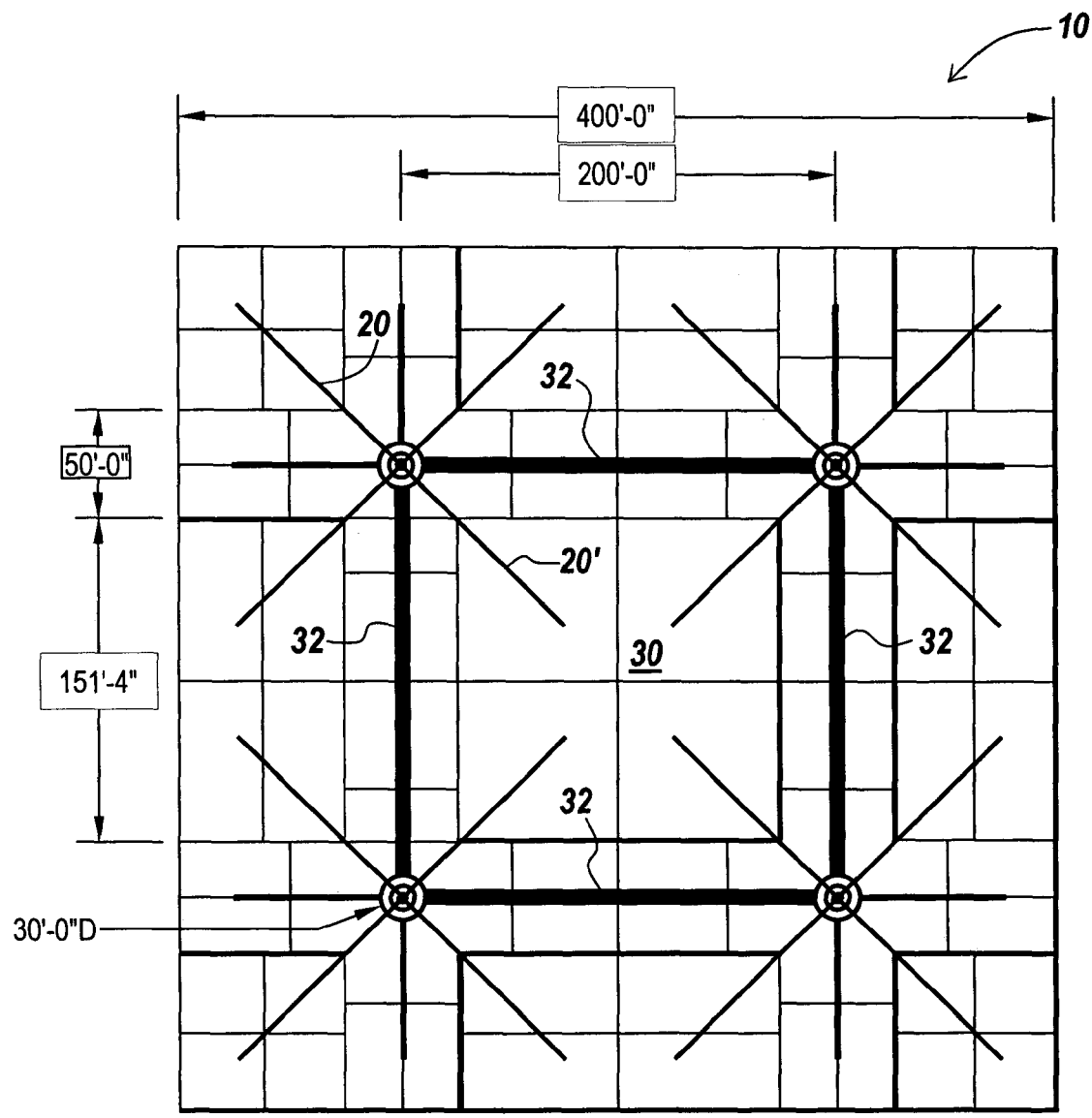
Figure 26:
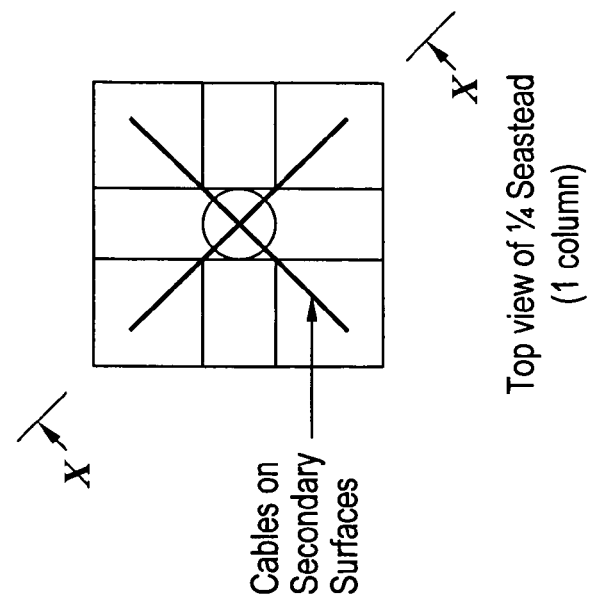
Figure 25:
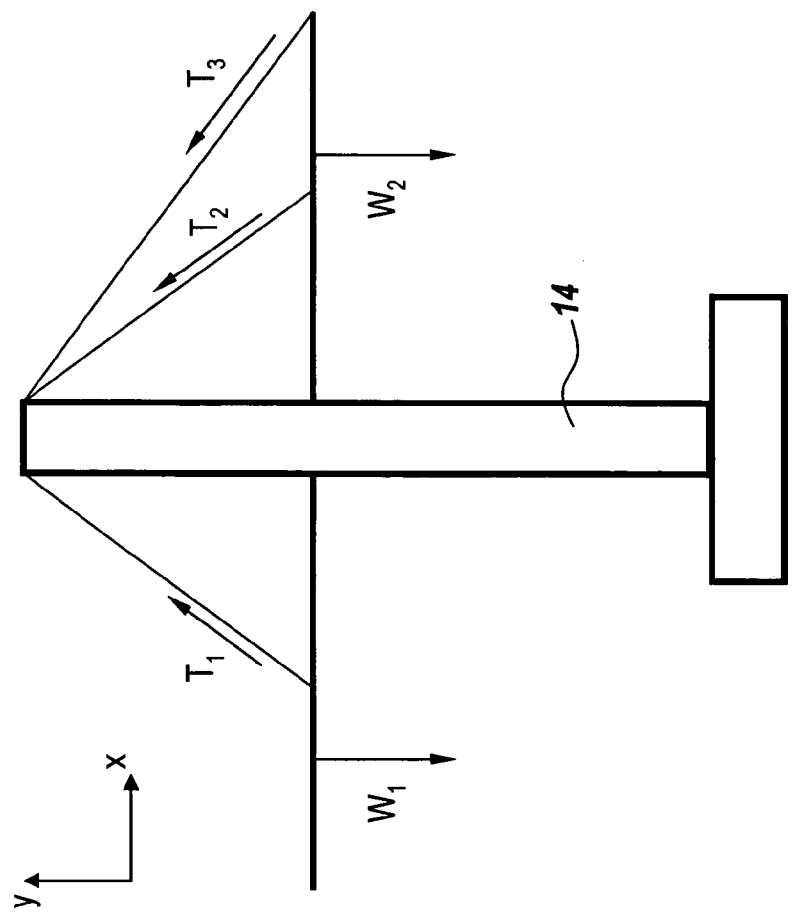
Figure 27:
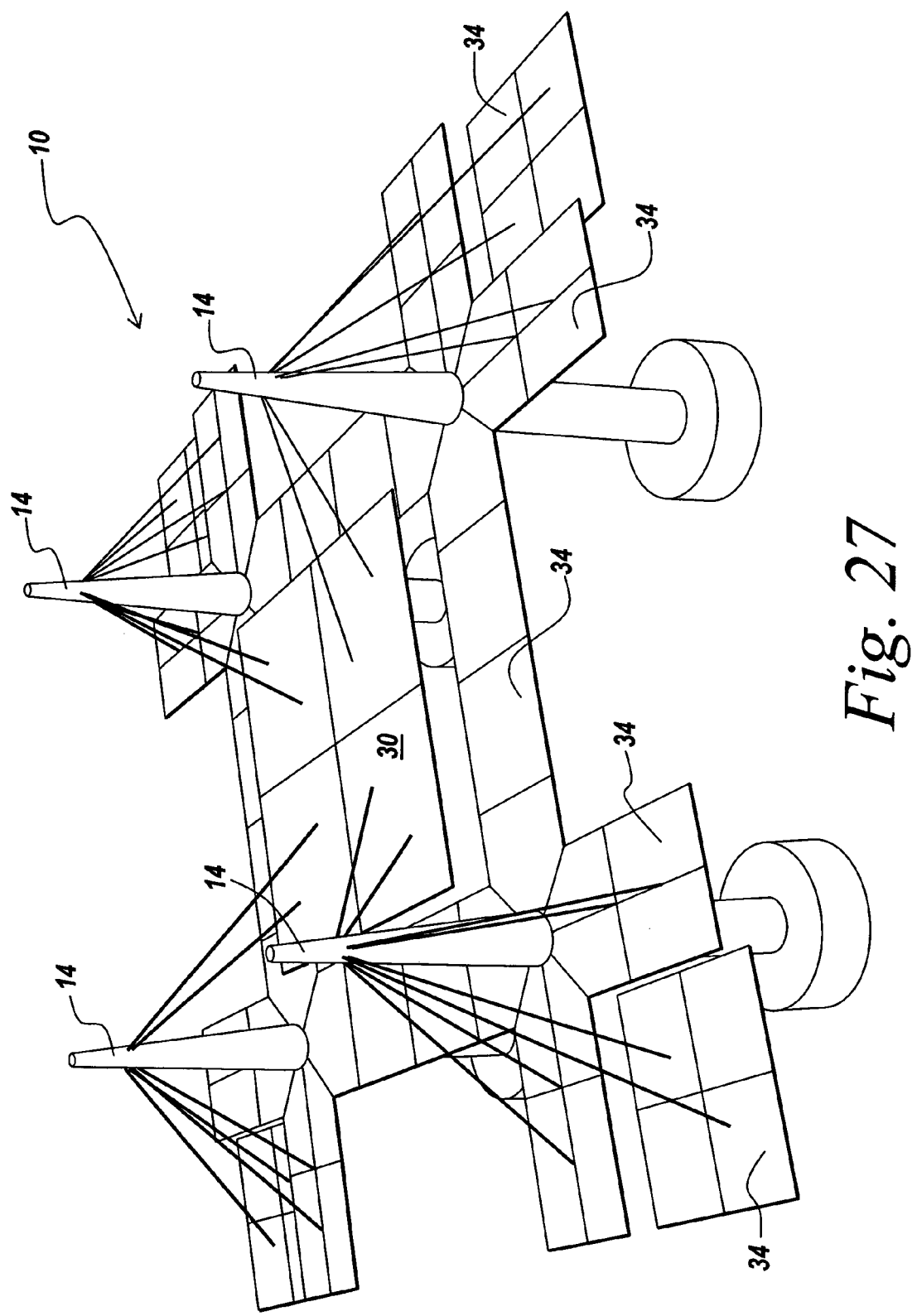
Figure 31:
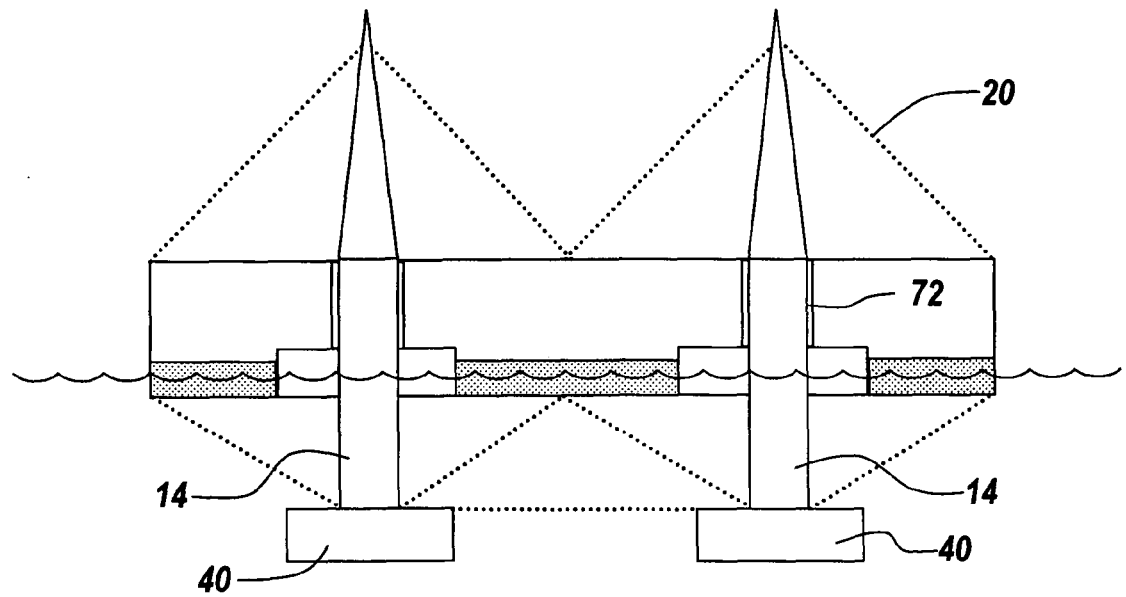
Figure 32:
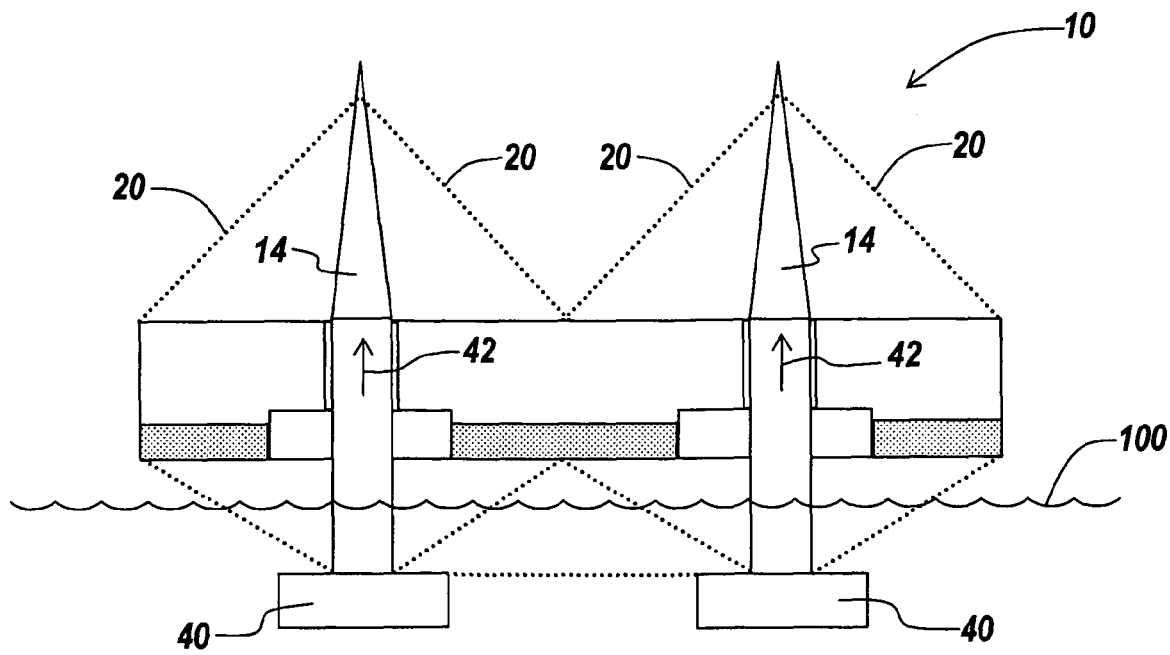
Figure 33:
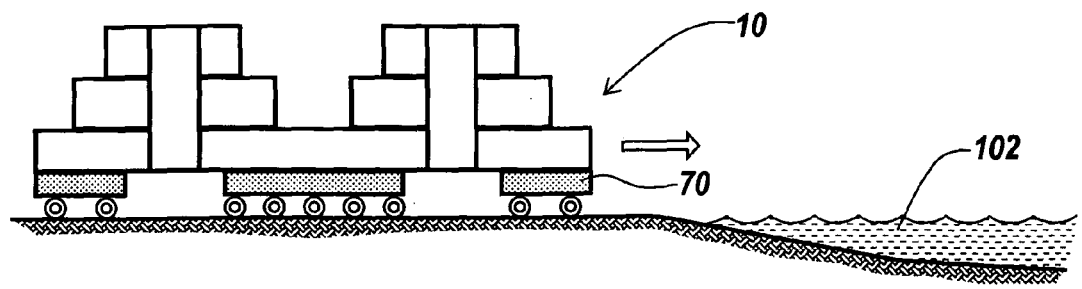
Figure 34:
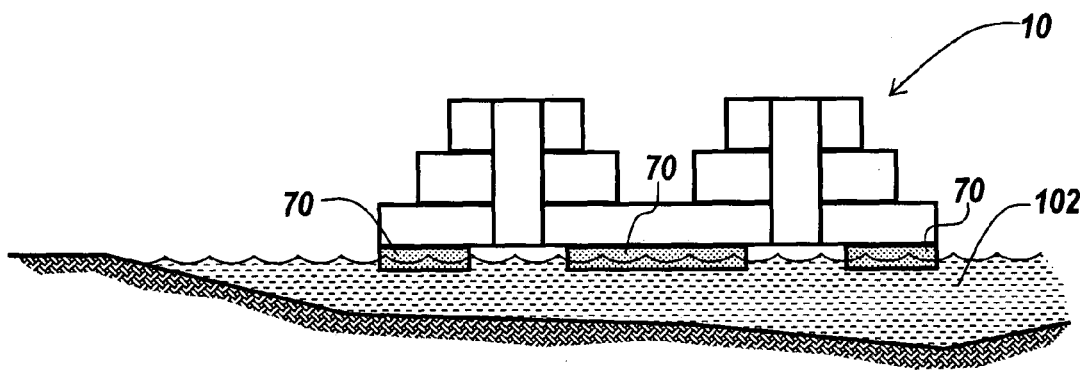
Figure 35:
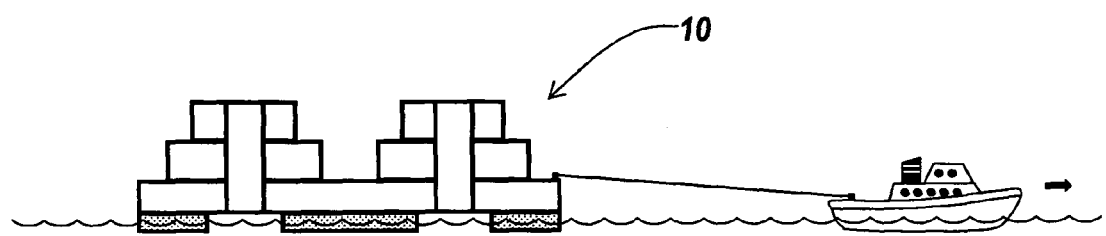
Figure 36:
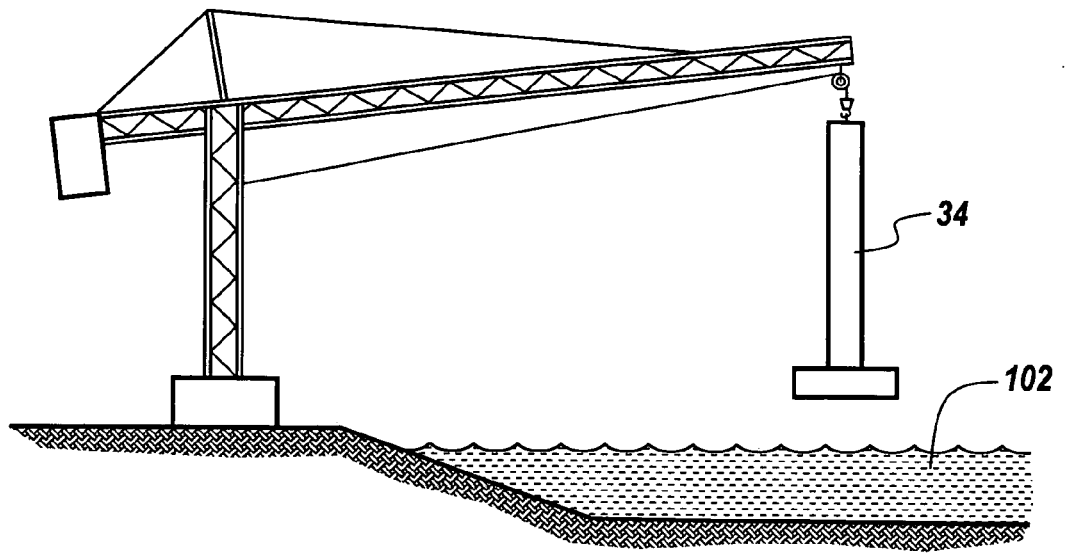
Figure 37:
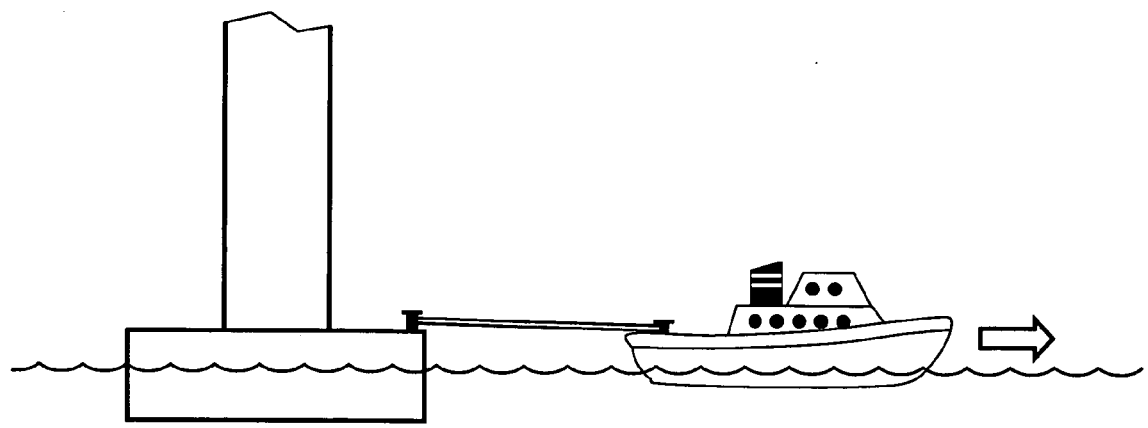

FIG. 7 is a diagrammatic illustration of the utilization of main trusses between the various columns of FIG. 3 that surround a central platform, also showing the utilization of buoyant modules to support both a central platform and the cantilevered lightweight platforms that are utilized to float the structures on the surface of the ocean prior to the structures being raised by evacuating the chambers in the footings of the columns;

FIG. 8 is a diagrammatic illustration of a portion of the assembly of FIG. 3 illustrating the provision of semi-cylindrical housings, tubes or pipes to house columns that translate or reciprocate in the tubes;

FIG. 9 is a diagrammatic illustration of the installation of the columns in the semi-circular tubes in FIG. 8 through the movement of the columns into the semi-cylindrical housings;

FIG. 10 is a diagrammatic illustration of the structure of FIG. 9 illustrating the semi-cylindrical housings in place where they are welded to adjacent structures;

FIG. 11 is a diagrammatic illustration of the structure of FIG. 7 showing the platform and attendant structure thereon being floated on the surface of the ocean by the modules of FIG. 7, also showing the downward ballasting;

FIG. 12 is a diagrammatic illustration of the structure of FIG. 11 illustrating the effect of de-ballasting the footings of the columns to raise the entire structure above the surface of the ocean;

FIG. 13 is a diagrammatic illustration of the reinforcement of the columns showing circumferential ribs and longitudinally positioned stringers or strengthening elements within a column;

FIG. 14 is a cross-sectional view of the column of FIG. 13 illustrating the position of the longitudinal stringers about the periphery of a circumferential rib;

FIG. 15 is a diagrammatic illustration of a column showing the utilization of sacrificial anodes about the surface of the column to minimize effects of electrolytic erosion of a column;

FIG. 16 is a diagrammatic illustration of one of the sacrificial anodes to be attached to a subsurface portion of the column of FIG. 15;

FIG. 17 is a diagrammatic illustration of the terminal ends of the stays of FIGS. 1, 2, and 3 illustrating a through-bolt assembly attached to a lip welded to a platform or building structure;

FIG. 18 is a diagrammatic illustration of the routing of the stays of the structure of FIG. 3 to an intermediate level of a building supported on a platform, illustrating that the stays need not run to the underlying deck but can be run to any structure supported by a platform;

FIG. 19 is a diagrammatic illustration of the provision on a column of a key for facilitating rotational locking of a column to the tube in which it is located;

FIG. 20 is a diagrammatic illustration of a portion of the column of FIG. 3 showing opposed keys on diametrically opposite sides of a column;

FIG. 21 is a diagrammatic illustration of the utilization of a keyway surrounding a key to permit translation of a column in a tube, while securing the column against rotation;

FIG. 22 is a diagrammatic illustration of the subject invention showing the securing of platforms with stays from the tops of the columns which project through a primary deck in the platform;

FIG. 23 is a side view of the structure of FIG. 22 showing that stays to one side of the column are counter balanced by stays to another side of the column;

FIG. 24 is a diagrammatic illustration showing the utilization of four columns, spacings between the columns, column diameters and the symmetrical use of stays about the column to prevent differential loading on a column;

FIG. 25 is a diagrammatic illustration of the tension and weight consideration for stays utilized to support a platform from a column;

FIG. 26 is a diagrammatic illustration of the utilization of cables to provide support for cantilevered portions of the platforms;

FIG. 27 is a diagrammatic illustration of the support of a central deck through the staying mechanisms of FIGS. 22, 23, and 24 illustrating the support of a central deck through the use of staying as well as the support of cantilevered decks at the periphery of the central deck using the subject staying methodology;

FIG. 28 is a diagrammatic illustration of the floating of a column on the surface of the ocean prior to assembly through a primary deck;

FIG. 29 is a diagrammatic illustration of the submergence of columns beneath a floating platform structure in which the tips of the columns are positioned below the cylinders used to capture the columns and pass them through the deck;

FIG. 30 is a diagrammatic illustration of the de-ballasting of the columns once the tips are within the cylindrical structures showing the upward movement of the columns through the deck;

FIG. 31 is a diagrammatic illustration of the positioning of stays in a relatively loose untensioned state when the columns are downwardly ballasted and with the platform being floated on the surface of the ocean;

FIG. 32 is a diagrammatic illustration of the structure of 31 showing the effect of de-ballasting the columns to tension the stays and then to move the entire structure above the surface of the ocean;

FIG. 33 is a diagrammatic illustration of one method of fabricating the subject structure by launching of deck modules from land into an adjacent body of water;

FIG. 34 is a diagrammatic illustration of the floating of the deck modules as launched in accordance with FIG. 33, showing the utilization of flotation modules to initially float the decks and buildings on a body of water;

FIG. 35 is a diagrammatic illustration of the towing of the floated structure of 34 into deeper water;

FIG. 36 is a diagrammatic illustration the launching of columns from the land into an adjacent body of water; and, FIG. 37 is a diagrammatic illustration of the towing of the floated columns into position for assembly to the final platform.

DETAILED DESCRIPTION

Referring now to FIG. 1, in order to provide sustainable living at sea for almost indefinite periods of time, it is important to be able to provide a community which is self-sustaining by having a sufficient amount of real estate in the middle of the ocean in which to carry on ones daily business.

In order to provide such a community with quarters, a structure 10 is floated on the surface of the ocean and is provided with a number of decks 12 which are supported on buoyant columns 14, with the decks being secured to the columns and being cantilevered from the columns as illustrated.

Central to the subject structure are stays 20, which run from the columns to outlying portions of the decks or to structures on the decks such as buildings 22 which are supported by stays 24 in one embodiment.

Cantilevering alone is not enough to be able to provide sufficient living space and it is only with the support of the peripheries of the decks which are cantilevered that sufficient living space can be provided.

As illustrated in FIG. 1, three of the four columns provided may be utilized to house personnel, whereas a fourth column shown in dotted outline at 14' is utilized to house the mechanical and electrical machinery utilized to sustain the community. This includes power generation and desalination.

Structure 10 is also provided with dock space 25 for the mooring of vessels 27 to the facility.

In one embodiment the stays are secured to respective columns by arcuate beams 26.

More particularly and referring now to FIG. 2, it can be seen that columns 14 project up through the decks in structure 10 with a central deck or platform 30 being supported at its periphery by trusses 32 which run between the columns. Deck 30 is the central deck and provides for the large bulk of the open space for the community housed by structure 10. Decks 34 are lightweight decks which surround the central deck and may be at various levels to both support building structures 22 and to provide further open space at the periphery of the facility. Thus, decks 34 provide lightweight surfaces cantilevered to the columns and to the central deck. These decks are also supported by stays 20, with the stays in one embodiment being arranged symmetrically about respective columns for load canceling purposes.

Referring now to FIG. 3, how structure 10 is supported on columns 14 is described. Here it can be sent that columns 14 are provided with footings 40, which include hollow chambers that are initially water filled. These columns are then at least partially evacuated to provide an upward force as illustrated by arrows 42 as they move upwardly. The columns are buoyant and when ballasting is pumped from footings 40, the entire structure moves upwardly as illustrated by arrows 44.

The purpose of the de-ballasted columns is to raise the entire structure above the sea surface since the platforms and decks move upwardly with the columns. Additionally, the upward movement of the columns tensions stays 20 such that when the columns move in an upward direction, both the portions of structure 10 which are directly attached to the columns, as well the decks which are both attached to the columns and supported by the stays, move upwardly with the de-ballasting of the columns.

In one embodiment, four columns are utilized which project up through the decks of structure 10 and their buoyancy lifts the structure above the surface of the ocean and provides damping against wave and wind action, with the stays being arranged so as to absorb any tortional forces as well as cantilevered forces due to wave and wind action. Thus, the buoyant columns with their oversized footings provide stability and motion control.

Note that in one embodiment stays 20 run through arcuate beams 26 and are anchored to a collar 31 melded to the column.

Figure 4:
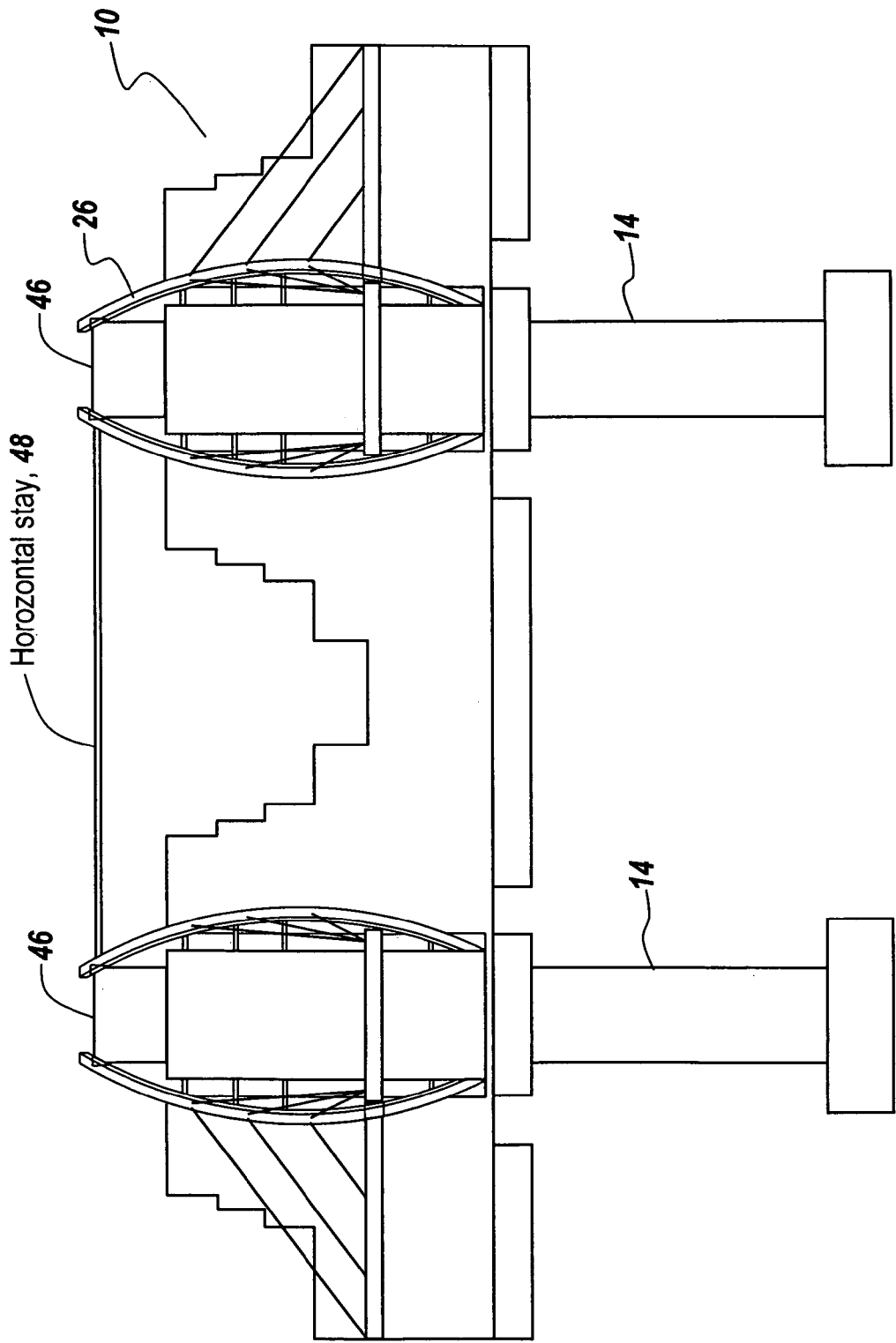
FIG. 4 is a diagrammatic illustration of the structure of FIG. 3 illustrating a horizontal stay for further column support and stabilization.

Referring to FIG. 4, in order to provide additional stability against unbalanced pressure loads on the columns and avoid prying and squeezing and related structural issues on the columns, the tops 46 of the columns may be interconnected with a horizontal stay or cable 48 to minimize relative movement between the tops of the columns. Such a cable provides support to the main truss in compression at the deck level.

Figure 5:
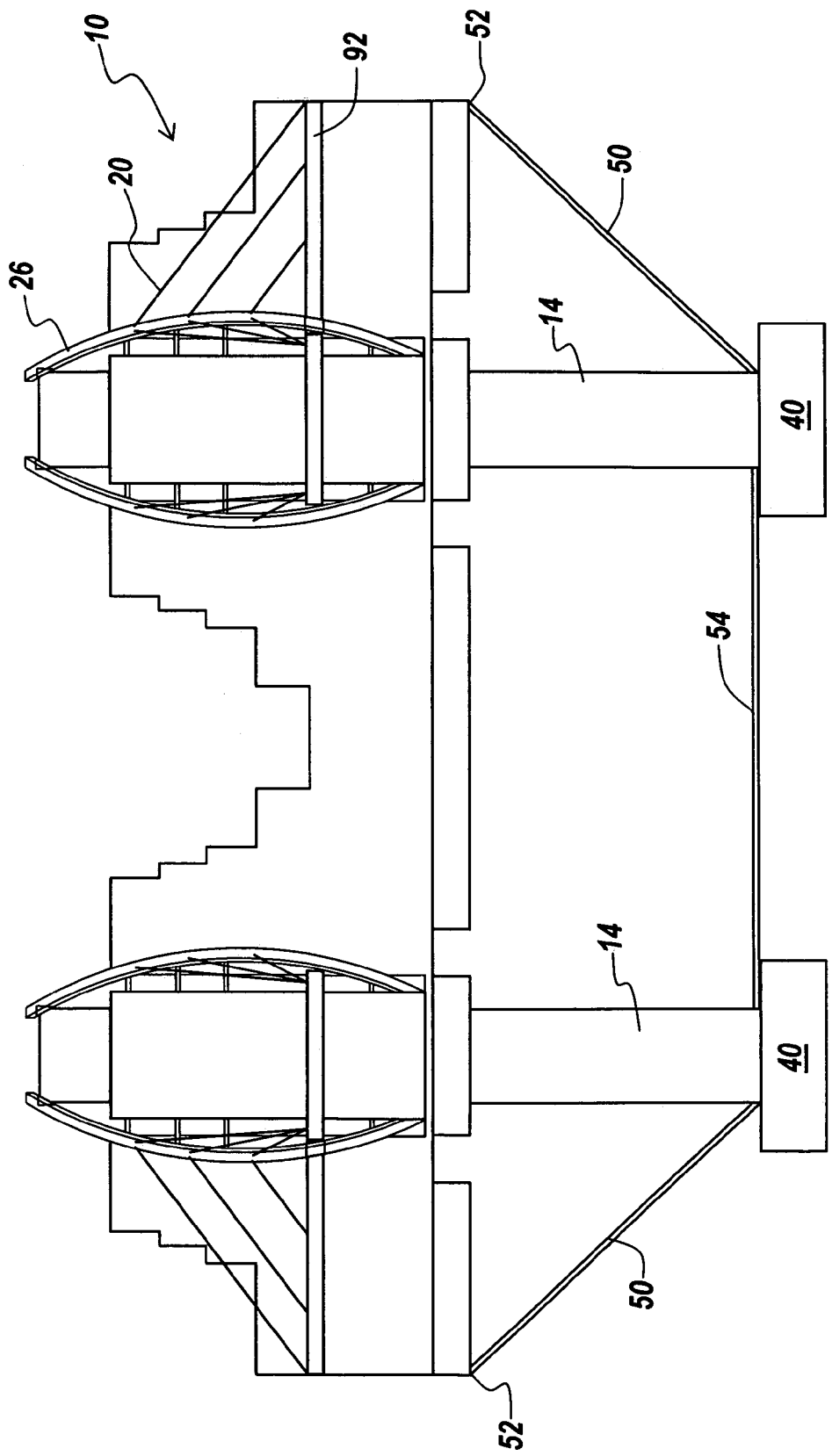
FIG. 5 is a diagrammatic illustration of the structure of FIG. 3 illustrating sub-surface cables or stays which support the columns and provide stability for the structure.

Referring now to FIG. 5, structure 10 may be provided with sub-surface stays or cables 50, which run in one embodiment from the base 40 of the columns to an edge 52 of structure 10. Additionally, a horizontal stay or cable 54 is mounted between adjacent footings of columns 14 to serve the same type of stabilization as provided by horizontal stays 48, with the tension-compression control staying provided by stays 48, 50 and 54 providing relative stability of the columns against hydrostatic and hydrodynamic loading.

Figure 6:
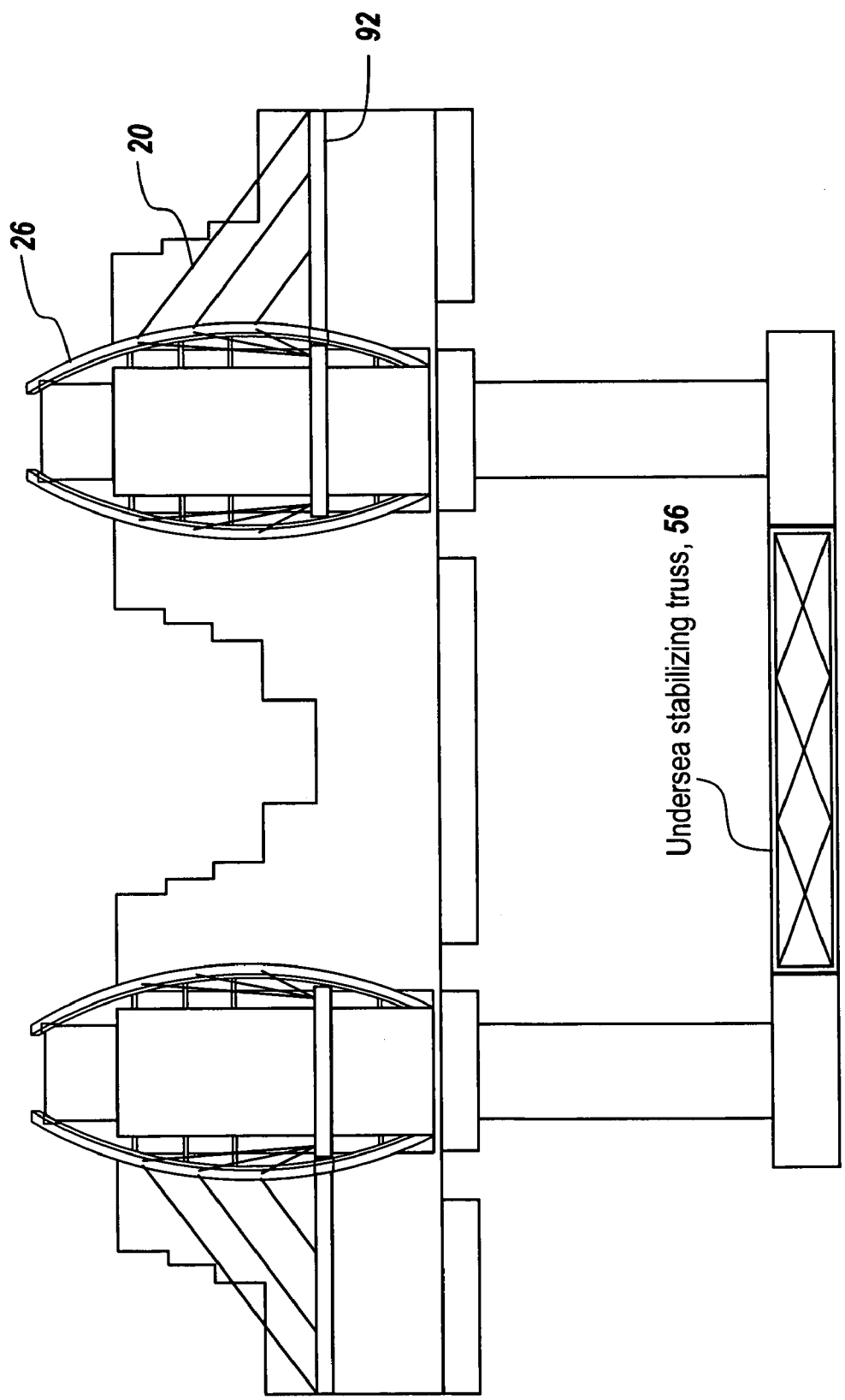
FIG. 6 is a diagrammatic illustration of the utilization of an underwater stabilization truss between the bases of the columns shown in FIG. 3.

Referring to FIG. 6, stay 54 of FIG. 5 may be replaced by an underwater stabilizing strut 56 to combat compressive forces. Thus, a small steel truss may be considered as an alternative to submerged cables to provide support to the main truss in tension as well as in compression. The truss would be made of I-Beams or similar elements that provide limited buoyancy.

Note that a cable or stay 48 runs from top to top between columns. This cable will be intension when the main truss is in compression and will relief the main truss in compression. It will also help to balance cable tensions on all sides of the columns. Alternatively or concurrently, cable 54 runs between columns at the bottom, under water. These cables are in tension when the main truss is in compression. Additional diagonal cables between the deck extremity and the bottom of columns will be in tension when the main truss is in tension.

With respect to the further use of trusses, and referring now to FIG. 7, main trusses 60 are positioned between adjacent columns 14 to absorb compressive forces as well as to provide for the appropriate spacing between the columns. As shown there can be interior main trusses 60 and exterior main trusses 60', with main deck 30 having its periphery attached to or fixed to the interior main trusses.

As will be seen, each of the lightweight main decks and intermediate structures are provided with buoyant modules 70, on which the associated structures are mounted. The modules are used to float the associated structures on the surface of the ocean either during initial construction or thereafter should there be any structural failure, or alternatively to facilitate on-site repair of the columns or the stays.

Referring to FIG. 8, it will be seen that the columns 14 are mounted for translation within column retaining tubes 72, which in one embodiment are split so as to enable an associated column to be moved into place from the side during construction.

In one embodiment, the columns are permitted to translate or reciprocate within the tubes either during the platform fabrication process or thereafter for placing tension on the forementioned stays.

Tubes 72 are provided with in one embodiment, with the aforementioned arcuate beams 26 which are affixed to the outer surface of a column after the column has been suitably situated within the tube and the tubes sealed along vertical seams.

The manner of construction is shown in FIG. 9, in which columns 14 are disposed within tubes 72. It will be noted that bases 40 of columns 14 when un-ballasted can sit within apertures 76 between flotation modules 70.

Also shown is longitudinal keys 78 attached to the outer surfaces of columns 14, which are used with key-ways to prevent rotational and horizontal movement of the column within the associated tube.

Referring now to FIG. 10, columns 14 project upwardly through tubes 72, with de-ballasted bases 40 within apertures 76. This is the position of the columns when the columns are floated into place adjacent to the open tube structure provided. Thereafter the footings of the columns are filled with water in a ballasting operation which partially sinks the columns.

Referring now to FIG. 11, when structure 10 has been completed and floated on modules 70 at the surface of the ocean, ballasted columns 14 extend well beneath the surface of the ocean.

Referring to FIG. 12, when the footings of the columns are de-ballasted, the columns rise as illustrated in the direction of arrows 42 to carry structure 10 above the ocean surface, both due to the physical attachment of the platform and deck structures to the columns, and due to the attachment of the stays to various decks and structures on the platform.

The structure shown in FIG. 12 is exceptionally stable with a multipoint floating buoyant system, with pitch, roll and heave damped considerably due both to the depth of the footings, and also the staying and trussing of structure 10.

Referring now to FIG. 13, in one embodiment column 14 is circumferentially reinforced by rings or ribs 80 which are disposed along the length of the column, with the column further being structurally enhanced by longitudinally running stringers 82 positioned about the periphery of ribs 80.

From a cross-sectional point of view and referring to FIG. 14, it can be seen that rib 80 is provided with annular slots 84 into which the longitudinally extending stringers 82 fit.

Referring now to FIG. 15, because of the marine environment and the attendant electrolysis associated with metal structures in sea water, column 14 is provided in one embodiment with sacrificial anodes 86 located about the sub-sea portions of column 14 on an exterior column wall and on the exterior of footing 40.

As shown in FIG. 16, these sacrificial anodes 86 may be provided through a cylindrical structure having mounting feet 88 which are attached physically to the associated column.

Referring now to FIG. 17, in one embodiment stays 20 run from arcuate beams 26 which are affixed to the columns 14 during manufacture after the column has passed through the retaining tubes described above.

As shown in FIG. 18, the distal ends 90 in one embodiment are attached to a flange 92 at a conventional cable anchor 94. Flange 92 may either be part of building 22 or deck 12, with the arcuate beams 26 being secured to columns 14 via struts 94 in one embodiment.

Alternatively and referring back to FIGS. 5 and 6, stays 20 may pass through arcuate beams 26 and be anchored interiorly of the acruate beam to a flange or some other transverse member to assist in securing the stays without further outward bowing of the arcuate beams.

Referring to FIG. 19 as mentioned hereinabove, columns 14 are provided with vertically running keys 78 that extend from footing 40 upwardly as illustrated. These keys run the full longitudinal length of column 14, and are restrained in a key-way 94 mounted to the aforementioned column retaining tubes so as to prevent rotation of the column relative to the tube and platform.

Referring to FIG. 22 as diagrammatically shown, columns 14 are provided with a number of stays 20 from the tops of the columns to the extremities of various decks 12 which may be at various levels. What is important to note is that in one embodiment, for each stay on one side of a column there is a counter-balancing stay on the other side of the column.

This can be more clearly seen in FIG. 23, in which stay 20' is balanced by stay 20'', whereas stay 20''' is balanced by stay 20''''.

This prevents column bending moments imparted to the portion of a column that extends up through the platform.

Referring now to FIG. 24, it can be seen that stays 20 and 20' are located on diametrically opposite sides of column 14. Also, trusses 32 are clearly shown between adjacent columns, with the central deck 30 being supported by the stays and attached to the trusses.

In one embodiment, structure 10 is on the order of 400 feet on a side, whereas the spacing between the columns is on the order of 200 feet, with the diameter of the columns in one embodiment being 30 feet.

Note that the central deck on the order of 150 feet, making the central open space a 150 foot by 150 foot open space area.

The cable tension and weight considerations for the cabling configuration of FIG. 25 are discussed in connection with FIG. 26 indicating in a top view the cables extending from a column top to the extremity of a deck.

Here, the horizontal forces due to the cable tensions on the column should cancel each other. For instance, the tension on cables 1 to 3 should be such that:

Horizontal forces: $T_{1,x} = -(T_{2,x} + T_{3,x})$

Vertical forces: $T_{1,y} = -W_1$ and $T_{2,y} + T_{3,y} = -W_2$

The angles of the cables as well as their tension may be tuned to respect these rules.

If the horizontal components of the tensions are not exactly balanced on all sides of a column, the column may be designed to support the resulting bending moment. Alternatively, suspended cables may be added between the tops of column to adjust the bending moment overall.

Standard stay cables are used. Multi-strand tendons are favored for redundancy purposes. Minimum breaking load on a single ½ inch diameter steel strand is typically 40 kips. Such tendons are made with high yield 270 ksi steel.

What is described in FIG. 27, is the utilization of multiple deck levels, all stayed from columns 14, in which the central deck 30 is clearly seen interior to the columns, also showing the lightweight external decks 34 located at various levels with respect to the columns.

It is noted that with the staying type system associated with the subject invention, the location of the various decks on structure 10 is made quite flexible.

In one method of constructing the subject platform and referring now to FIG. 28, columns 14 may be floated on their footings 40 to the vicinity of the structure which when fabricated consists of modules or decks previously floated into place as illustrated in FIG. 29. Here floating modules 70 serve to support column retaining tubes 72, in turn attached to the decks and other components of structure 10. As can be seen, the tip 14' of a column may be ballasted so that it is completely underneath the surface of the sea. When de-ballasted, it moves upwardly into the associated tube 72 which, as illustrated in FIG. 30 results in the columns 14 projecting upwardly through tubes 72 and therefore upwardly through the platform, with associated footings 40 accommodated in apertures in the flotation modules.

As illustrated in 31, with columns 14 partially extending through tubes 72 and supported laterally by tubes 72, stays 20 running from the tops of the columns to the extremities of the decks or structures initially may be tensioned fairly loosely at this portion of the construction project.

Referring to FIG. 32, when columns 14 are raised by de-ballasting footings 40, stays 20 become taut and begin to support the decks and other structures to which they are attached. Thereafter with the upward movement of the columns as illustrated by arrows 42, the entire structure 10 is moved above the surface of the water here illustrated at 100.

What has been described above is one method of assembly of the subject structure. However, referring to FIG. 33 it can be seen that structure 10 may be pre-assembled on land as illustrated with flotation 70 modules attached. The entire structure is rolled into an adjacent body of water 102, and as shown in FIG. 34 floats due to the use of these flotation modules. After flotation, this assembly is then towed to a construction location as illustrated at FIG. 35.

Referring to FIG. 36, a column 14 is pre-assembled on land and craned into the adjacent body of water where it is towed as illustrated in FIG. 37 to the appropriate location.

Thereafter, either the construction method of provided bifurcated retaining tubes is utilized where the erect columns are simply floated into place, or as illustrated hereinbefore the columns are completely submerged and come up through bottom apertures in the tubes until they are thrust up through the deck and building structure, whereupon they are attached to the surrounding decks and structure, both by physical attachment in terms of welding, and also by the aforementioned stays.

As a result an affordable large waterborne seasteading community can be housed and located offshore, in which a community of large numbers of individuals can live almost indefinitely in the middle of the ocean due to the large floating platform provided by the subject invention.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A method of situating and housing communities in the middle of the ocean, comprising the step of:
providing a floating facility designed to be positioned above the surface of the ocean and having a living area to accommodate hundreds of individuals participating in the community by providing a platform with a number of vertically-oriented buoyant columns, each having a portion projecting up through the platform and a lower portion designed to be submerged in the ocean having a footing that can be ballasted and un-ballasted through the pumping of water into and out of the footing, the platform being supported in part by stays running from a column to the platform, where the weight and tortional loading associated with the platform are borne by a column, the step of running stays including providing each of the columns with arcuate beams attached to the exterior thereof and running the stays from the platform to an adjacent arcuate beam.

2. The method of claim 1, wherein a stay that is run to an arcuate beam passes through an aperture in the arcuate beam and is attached to a portion of the associated column.

* * * * *